United States Patent
Lambert et al.

(10) Patent No.: US 10,895,686 B2
(45) Date of Patent: Jan. 19, 2021

(54) INTEGRATED PHOTONICS MODE EXPANDER

(71) Applicant: Skorpios Technologies, Inc., Albuquerque, NM (US)

(72) Inventors: Damien Lambert, Los Altos, CA (US); Guoliang Li, San Diego, CA (US); John Zyskind, Albuquerque, NM (US); Stephen B. Krasulick, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 15/968,454

(22) Filed: May 1, 2018

(65) Prior Publication Data
US 2018/0348432 A1    Dec. 6, 2018

Related U.S. Application Data

(60) Division of application No. 15/051,348, filed on Feb. 23, 2016, now Pat. No. 9,977,188, which is a (Continued)

(51) Int. Cl.
*G02B 6/13* (2006.01)
*G02B 6/14* (2006.01)
(Continued)

(52) U.S. Cl.
CPC ............ *G02B 6/14* (2013.01); *G02B 6/1228* (2013.01); *G02B 6/132* (2013.01); *G02B 6/136* (2013.01);
(Continued)

(58) Field of Classification Search
None
See application file for complete search history.

(56) References Cited

U.S. PATENT DOCUMENTS

| 3,905,676 A | 9/1975 | Ulrich |
| 4,182,545 A | 1/1980 | Greer |

(Continued)

FOREIGN PATENT DOCUMENTS

| CN | 101637007 A | 1/2010 |
| CN | 101641622 A | 2/2010 |

(Continued)

OTHER PUBLICATIONS

Analui et al.; "A Fully Integrated 20-Gb/s Optoelectronic Transceiver Implemented in a Standard 0.13-mu-m CMOS SOI Technology", IEEE Journal of Solid State Circuits, vol. 41, No. 12, Dec. 2006, retrieved from the Internet <http://ieeexplore.ieee.org/xpls/abs_all.jsp?arnumber=4014595&tag=1>, 11 pages.

(Continued)

*Primary Examiner* — Michael Stahl
(74) *Attorney, Agent, or Firm* — Kilpatrick Townsend & Stockton LLP

(57) ABSTRACT

A method of fabricating a waveguide mode expander includes providing a substrate including a waveguide, bonding a chiplet including multiple optical material layers in a mounting region adjacent an output end of the waveguide, and selectively removing portions of the chiplet to form tapered stages that successively increase in number and lateral size from a proximal end to a distal end of the chiplet. The first optical material layer supports an input mode substantially the same size as a mode exiting the waveguide. One or more of the overlying layers, when combined with the first layer, support a larger, output optical mode size. Each tapered stage of the mode expander is formed of a portion of a respective layer of the chiplet. The first layer and the tapered stages form a waveguide mode expander that expands an optical mode of light traversing the chiplet.

20 Claims, 20 Drawing Sheets

Related U.S. Application Data continuation-in-part of application No. 14/722,970, filed on May 27, 2015, now Pat. No. 9,885,832.

(60) Provisional application No. 62/119,750, filed on Feb. 23, 2015, provisional application No. 62/044,867, filed on Sep. 2, 2014, provisional application No. 62/003,404, filed on May 27, 2014.

(51) Int. Cl.

| | | |
|---|---|---|
| *G02B 6/122* | (2006.01) | |
| *G02B 6/136* | (2006.01) | |
| *G02B 6/132* | (2006.01) | |
| *G02B 6/30* | (2006.01) | |
| *G02B 6/12* | (2006.01) | |

(52) U.S. Cl.
CPC .... *G02B 6/305* (2013.01); *G02B 2006/12061* (2013.01); *G02B 2006/12097* (2013.01); *G02B 2006/12152* (2013.01)

(56) References Cited

U.S. PATENT DOCUMENTS

| | | | |
|---|---|---|---|
| 4,199,222 | A | 4/1980 | Ikushima et al. |
| 4,293,826 | A | 10/1981 | Scifres et al. |
| 4,389,567 | A | 6/1983 | Khoe |
| 4,423,922 | A | 1/1984 | Porter |
| 4,799,749 | A | 1/1989 | Borner |
| 4,886,538 | A | 12/1989 | Mahapatra |
| 4,889,406 | A | 12/1989 | Sezerman |
| 4,932,032 | A | 6/1990 | Koch |
| 5,190,883 | A | 3/1993 | Menigaux et al. |
| 5,260,567 | A | 11/1993 | Kuroda et al. |
| 5,319,667 | A | 6/1994 | Dutting et al. |
| 5,333,219 | A | 7/1994 | Kuznetsov |
| 5,454,058 | A | 9/1995 | Mace et al. |
| 5,579,424 | A | 11/1996 | Schneider |
| 5,586,209 | A | 12/1996 | Matsuura |
| 5,633,512 | A | 5/1997 | Okuda |
| 5,745,614 | A | 4/1998 | Kersten et al. |
| 5,818,989 | A | 10/1998 | Makamura |
| 5,838,070 | A | 11/1998 | Nare et al. |
| 5,858,814 | A | 1/1999 | Goossen et al. |
| 5,981,400 | A | 11/1999 | Lo |
| 5,987,046 | A | 11/1999 | Kobayashi |
| 5,987,050 | A | 11/1999 | Doerr et al. |
| 6,101,210 | A | 8/2000 | Bestwick et al. |
| 6,108,478 | A * | 8/2000 | Harpin .................. G02B 6/1228 385/129 |
| 6,118,978 | A | 9/2000 | Ihmels |
| 6,192,058 | B1 | 2/2001 | Abeles |
| 6,229,792 | B1 | 5/2001 | Anderson et al. |
| 6,229,947 | B1 | 5/2001 | Vawter |
| 6,310,995 | B1 | 10/2001 | Saini |
| 6,339,606 | B1 | 1/2002 | Alphonse |
| 6,480,327 | B1 | 11/2002 | Betin |
| 6,509,139 | B1 | 1/2003 | Roberts et al. |
| 6,571,039 | B1 | 5/2003 | Al-hemyari |
| 6,690,857 | B2 | 2/2004 | Zhao et al. |
| 6,714,566 | B1 | 3/2004 | Coldren et al. |
| 6,728,279 | B1 | 4/2004 | Sarlet et al. |
| 6,768,855 | B1 | 7/2004 | Bakke et al. |
| 6,788,721 | B2 | 9/2004 | Yang et al. |
| 6,829,561 | B2 | 12/2004 | Keller et al. |
| 6,846,694 | B2 | 1/2005 | Fukhima et al. |
| 6,888,989 | B1 | 5/2005 | Zhou et al. |
| 6,931,178 | B2 | 8/2005 | Saccomanno |
| 7,005,247 | B1 * | 2/2006 | Fong .................. G02B 6/12011 216/24 |
| 7,006,746 | B2 | 2/2006 | Blalock |
| 7,016,560 | B2 | 3/2006 | Ticknor |
| 7,058,096 | B2 | 6/2006 | Sarlet et al. |
| 7,082,235 | B2 | 7/2006 | Gunn |
| 7,120,336 | B2 | 10/2006 | Sandhu |
| 7,257,283 | B1 | 8/2007 | Liu et al. |
| 7,317,853 | B2 | 1/2008 | Laurent-Lund |
| 7,323,353 | B2 | 1/2008 | Sandhu |
| 7,326,611 | B2 | 2/2008 | Forbes |
| 7,359,593 | B2 | 4/2008 | Little |
| 7,359,607 | B2 | 4/2008 | Blalock |
| 7,392,247 | B2 | 6/2008 | Chen et al. |
| 7,464,147 | B1 | 12/2008 | Fakhouri et al. |
| 7,519,257 | B2 | 4/2009 | Lipson et al. |
| 7,531,395 | B2 | 5/2009 | Blomiley et al. |
| 7,539,373 | B1 | 5/2009 | Logvin |
| 7,598,527 | B2 | 10/2009 | Behfar et al. |
| 7,633,988 | B2 | 12/2009 | Fish et al. |
| 7,701,985 | B2 | 4/2010 | Webster et al. |
| 7,720,341 | B2 | 5/2010 | Blalock |
| 7,796,656 | B2 | 9/2010 | Watson |
| 7,831,116 | B2 | 11/2010 | Kim |
| 7,936,955 | B2 | 5/2011 | Blalock |
| 7,939,934 | B2 | 5/2011 | Haba et al. |
| 7,972,875 | B2 | 7/2011 | Rogers et al. |
| 8,025,444 | B2 | 9/2011 | Choi et al. |
| 8,106,379 | B2 | 1/2012 | Bowers |
| 8,170,383 | B2 | 5/2012 | Tokhima |
| 8,195,020 | B2 | 6/2012 | Sandhu |
| 8,222,084 | B2 | 7/2012 | Dallesasse et al. |
| 8,254,735 | B2 | 8/2012 | Tsai |
| 8,271,205 | B2 | 9/2012 | Reja et al. |
| 8,290,014 | B2 | 10/2012 | Junesand et al. |
| 8,320,721 | B2 | 11/2012 | Cevini et al. |
| 8,368,995 | B2 | 2/2013 | Dallesasse et al. |
| 8,445,326 | B2 | 5/2013 | Dallesasse et al. |
| 8,483,528 | B2 | 7/2013 | Socci et al. |
| 8,488,923 | B2 | 7/2013 | Na |
| 8,542,763 | B2 | 9/2013 | Forenza et al. |
| 8,559,470 | B2 | 10/2013 | Dallesasse et al. |
| 8,605,766 | B2 | 12/2013 | Dallesasse et al. |
| 8,611,388 | B2 | 12/2013 | Krasulick et al. |
| 8,615,025 | B2 | 12/2013 | Dallesasse et al. |
| 8,620,230 | B2 | 12/2013 | Sanderovitz et al. |
| 8,630,326 | B2 | 1/2014 | Krasulick et al. |
| 8,722,464 | B2 | 5/2014 | Dallesasse et al. |
| 8,859,394 | B2 | 10/2014 | Dallesasse et al. |
| 9,042,697 | B2 | 5/2015 | Sandhu |
| 9,075,192 | B2 | 7/2015 | Adams |
| 9,097,846 | B2 | 8/2015 | Mizrahi et al. |
| 9,195,001 | B2 | 11/2015 | Hatori et al. |
| 9,268,088 | B2 | 2/2016 | Mizrahi et al. |
| 9,279,750 | B2 | 3/2016 | Cremins et al. |
| 9,316,785 | B2 | 4/2016 | Krasulick et al. |
| 9,348,099 | B2 | 5/2016 | Krishnamurthi et al. |
| 9,354,396 | B2 | 5/2016 | Baudot |
| 9,429,693 | B2 | 8/2016 | Takahashi et al. |
| 9,529,151 | B2 | 12/2016 | Goi et al. |
| 9,606,291 | B2 | 3/2017 | Ellis-Monaghan et al. |
| 9,625,641 | B2 | 4/2017 | Kumar et al. |
| 9,658,401 | B2 | 5/2017 | Li et al. |
| 9,933,575 | B2 | 4/2018 | Kumar et al. |
| 10,209,451 | B2 | 2/2019 | Kumar et al. |
| 10,295,746 | B2 | 5/2019 | Sodagar et al. |
| 10,345,521 | B2 | 7/2019 | Li et al. |
| 2001/0010743 | A1 | 8/2001 | Cayrefourcq et al. |
| 2001/0026670 | A1 | 10/2001 | Takizawa |
| 2002/0064337 | A1 | 5/2002 | Behin et al. |
| 2002/0097962 | A1 | 7/2002 | Yoshimura et al. |
| 2002/0197013 | A1 | 12/2002 | Liu et al. |
| 2003/0035446 | A1 | 2/2003 | Griffel |
| 2003/0042494 | A1 | 3/2003 | Worley |
| 2003/0081877 | A1 | 5/2003 | Nakata et al. |
| 2003/0128724 | A1 | 7/2003 | Morthier |
| 2003/0129660 | A1 | 7/2003 | Zien et al. |
| 2003/0210725 | A1 | 11/2003 | Prassas |
| 2004/0017962 | A1 | 1/2004 | Lee et al. |
| 2004/0022223 | A1 | 2/2004 | Billhartz |
| 2004/0037342 | A1 | 2/2004 | Blauvelt et al. |
| 2004/0062485 | A1 | 4/2004 | Kelly |
| 2004/0066999 | A1 | 4/2004 | Sakamoto et al. |
| 2004/0077135 | A1 | 4/2004 | Fan et al. |
| 2004/0111397 | A1 | 6/2004 | Chen et al. |
| 2004/0114872 | A1 | 6/2004 | Nagai |

(56) References Cited

U.S. PATENT DOCUMENTS

| | | |
|---|---|---|
| 2004/0120675 A1 | 6/2004 | Skinner et al. |
| 2004/0182914 A1 | 9/2004 | Venugopalan |
| 2004/0228384 A1 | 11/2004 | Oh et al. |
| 2004/0245425 A1 | 12/2004 | Delpiano et al. |
| 2004/0258360 A1 | 12/2004 | Lim |
| 2004/0259279 A1 | 12/2004 | Erchak et al. |
| 2004/0264840 A1 | 12/2004 | Mule et al. |
| 2005/0033858 A1 | 2/2005 | Swildens et al. |
| 2005/0058416 A1 | 3/2005 | Lee et al. |
| 2005/0082552 A1 | 4/2005 | Fang et al. |
| 2005/0105853 A1 | 5/2005 | Liu et al. |
| 2005/0117844 A1 | 6/2005 | Abeles et al. |
| 2005/0123244 A1 | 6/2005 | Block et al. |
| 2005/0185893 A1 | 8/2005 | Liu et al. |
| 2005/0202554 A1 | 9/2005 | Luo et al. |
| 2005/0211465 A1 | 9/2005 | Sunohara et al. |
| 2005/0211993 A1 | 9/2005 | Sano et al. |
| 2005/0213618 A1 | 9/2005 | Sochava et al. |
| 2005/0226284 A1 | 10/2005 | Tanaka et al. |
| 2005/0286426 A1 | 12/2005 | Padhye et al. |
| 2006/0002443 A1 | 1/2006 | Farber et al. |
| 2006/0093002 A1 | 5/2006 | Park et al. |
| 2006/0104322 A1 | 5/2006 | Park et al. |
| 2006/0109542 A1 | 5/2006 | Mizuuchi |
| 2006/0115215 A1 | 6/2006 | Liu |
| 2006/0285797 A1 | 12/2006 | Little |
| 2007/0002924 A1 | 1/2007 | Hutchinson et al. |
| 2007/0172189 A1 | 7/2007 | Koehl |
| 2007/0223549 A1 | 9/2007 | Livshits |
| 2007/0280326 A1 | 12/2007 | Piede et al. |
| 2008/0002928 A1 | 1/2008 | Li |
| 2008/0266639 A1 | 10/2008 | Melloni et al. |
| 2009/0016399 A1 | 1/2009 | Bowers |
| 2009/0020499 A1 | 1/2009 | Nottola et al. |
| 2009/0087137 A1 | 4/2009 | Doan |
| 2009/0135861 A1 | 5/2009 | Webster et al. |
| 2009/0225796 A1 | 9/2009 | Kato |
| 2009/0267173 A1 | 10/2009 | Takahashi et al. |
| 2009/0278233 A1 | 11/2009 | Pinnington et al. |
| 2009/0294803 A1 | 12/2009 | Nuzzo et al. |
| 2009/0310140 A1 | 12/2009 | Smith et al. |
| 2010/0040327 A1 | 2/2010 | Deki et al. |
| 2010/0042668 A1 | 2/2010 | Liang et al. |
| 2010/0111128 A1 | 5/2010 | Qin et al. |
| 2010/0114846 A1 | 5/2010 | LaChapelle et al. |
| 2010/0123145 A1 | 5/2010 | Lee |
| 2010/0238855 A1 | 9/2010 | Yoshida et al. |
| 2010/0247031 A1 | 9/2010 | Hayakawa |
| 2010/0247037 A1 | 9/2010 | Little |
| 2010/0266288 A1 | 10/2010 | Little |
| 2010/0302992 A1 | 12/2010 | Zhuang |
| 2011/0012261 A1 | 1/2011 | Choi et al. |
| 2011/0032964 A1 | 2/2011 | Sauer et al. |
| 2011/0044193 A1 | 2/2011 | Forenze et al. |
| 2011/0085572 A1 | 4/2011 | Dallesasse et al. |
| 2011/0085577 A1 | 4/2011 | Krasulick et al. |
| 2011/0085760 A1 | 4/2011 | Han et al. |
| 2011/0089524 A1 | 4/2011 | Nonagaki |
| 2011/0158584 A1 | 6/2011 | Popovic |
| 2011/0163444 A1 | 7/2011 | Hayashi |
| 2011/0165707 A1 | 7/2011 | Lott et al. |
| 2011/0205660 A1 | 8/2011 | Komura et al. |
| 2011/0211604 A1 | 9/2011 | Roscher |
| 2011/0216997 A1 | 9/2011 | Gothoskar et al. |
| 2011/0217002 A1 | 9/2011 | Mekis et al. |
| 2011/0267676 A1 | 11/2011 | Dallesasse et al. |
| 2012/0001166 A1 | 1/2012 | Doany et al. |
| 2012/0002694 A1 | 1/2012 | Bowers et al. |
| 2012/0002931 A1 | 1/2012 | Watanabe |
| 2012/0057079 A1 | 3/2012 | Dallesasse et al. |
| 2012/0057609 A1 | 3/2012 | Dallesasse et al. |
| 2012/0057610 A1 | 3/2012 | Dallesasse et al. |
| 2012/0057816 A1 | 3/2012 | Krasulick et al. |
| 2012/0091594 A1 | 4/2012 | Landesberger et al. |
| 2012/0093456 A1 | 4/2012 | Taillaert et al. |
| 2012/0120978 A1 | 5/2012 | Budd et al. |
| 2012/0149148 A1 | 6/2012 | Dallesasse et al. |
| 2012/0170931 A1 | 6/2012 | Evans et al. |
| 2012/0189317 A1 | 7/2012 | Heck et al. |
| 2012/0224813 A1 | 9/2012 | Chen et al. |
| 2012/0230635 A1 | 9/2012 | Yoshida |
| 2012/0264256 A1 | 10/2012 | Dallesasse et al. |
| 2012/0320939 A1 | 12/2012 | Baets et al. |
| 2013/0022312 A1 | 1/2013 | Taillaert et al. |
| 2013/0037905 A1 | 2/2013 | Shubin et al. |
| 2013/0051727 A1 | 2/2013 | Mizrahi et al. |
| 2013/0107741 A1 | 5/2013 | Huang et al. |
| 2013/0170793 A1 | 7/2013 | Ushida |
| 2013/0209033 A1* | 8/2013 | Luff .................... G02B 6/1228 385/28 |
| 2013/0210214 A1 | 8/2013 | Dallesasse et al. |
| 2013/0216177 A1 | 8/2013 | Tseng et al. |
| 2013/0251299 A1 | 9/2013 | He et al. |
| 2013/0301975 A1 | 11/2013 | Spann et al. |
| 2013/0302920 A1 | 11/2013 | Dallesasse et al. |
| 2014/0064658 A1 | 3/2014 | Ramaswamy et al. |
| 2014/0133817 A1 | 5/2014 | Lealman |
| 2014/0179036 A1 | 6/2014 | Krasulick et al. |
| 2014/0252411 A1 | 9/2014 | Kang et al. |
| 2014/0270620 A1 | 9/2014 | Anderson et al. |
| 2014/0319656 A1 | 10/2014 | Marchena et al. |
| 2015/0097211 A1 | 4/2015 | Krasulick et al. |
| 2015/0219853 A1 | 8/2015 | Kumar et al. |
| 2015/0234124 A1 | 8/2015 | Tseng et al. |
| 2015/0253471 A1 | 9/2015 | Takahashi |
| 2015/0253472 A1 | 9/2015 | Kumar et al. |
| 2015/0316723 A1 | 11/2015 | Taylor |
| 2015/0346429 A1 | 12/2015 | Lambert et al. |
| 2015/0346430 A1 | 12/2015 | Li et al. |
| 2015/0362673 A1 | 12/2015 | Xuezhe et al. |
| 2016/0306111 A1 | 10/2016 | Lambert |
| 2017/0090118 A1 | 3/2017 | Sodagar et al. |
| 2017/0242192 A1 | 8/2017 | Sodagar et al. |
| 2017/0307648 A1 | 10/2017 | Kotake et al. |
| 2018/0196197 A1 | 7/2018 | Sodagar et al. |
| 2018/0356596 A1 | 12/2018 | Kumar et al. |

FOREIGN PATENT DOCUMENTS

| | | |
|---|---|---|
| CN | 203241564 U | 10/2013 |
| CN | 10-6133999 A | 11/2016 |
| EP | 0696747 A2 | 2/1996 |
| EP | 2141525 A1 | 1/2010 |
| EP | 2544319 A1 | 1/2013 |
| EP | 2648906 A1 | 10/2013 |
| EP | 2751603 A1 | 7/2014 |
| JP | 09197179 A | 7/1997 |
| JP | 2000-089054 A2 | 3/2000 |
| JP | 2003-078530 A | 3/2003 |
| JP | 2006-186446 A | 7/2006 |
| JP | 2007-074202 A | 3/2007 |
| JP | 2008-147209 A | 6/2008 |
| JP | 2010-522372 A | 7/2010 |
| JP | 2010-199972 A | 9/2010 |
| JP | 2010-281899 A | 12/2010 |
| JP | 2011-033963 A | 2/2011 |
| JP | 2011-075917 A | 4/2011 |
| JP | 2013-507792 A | 4/2013 |
| JP | 2014-525608 A | 9/2014 |
| KR | 2014-0060547 A | 5/2014 |
| KR | 2014/0060548 A | 5/2014 |
| KR | 2014-0060548 A | 5/2014 |
| TW | 2011-40975 A | 11/2011 |
| WO | 03-012512 A1 | 2/2003 |
| WO | 2010/033435 A2 | 3/2010 |
| WO | 2011/046898 A1 | 4/2011 |
| WO | 2012/078361 A1 | 6/2012 |
| WO | 2013/033252 A1 | 3/2013 |
| WO | 2013/109955 A1 | 7/2013 |
| WO | 2014/021411 A1 | 2/2014 |
| WO | 2014/025824 A2 | 2/2014 |
| WO | 2014/176561 A1 | 10/2014 |
| WO | 2015/054491 A1 | 4/2015 |
| WO | 2015/120260 A1 | 8/2015 |

(56) References Cited

FOREIGN PATENT DOCUMENTS

| WO | 2015/134968 A1 | 9/2015 |
| WO | 2015/183992 A1 | 12/2015 |
| WO | 2016/172202 A1 | 10/2016 |

OTHER PUBLICATIONS

Barkai, A., et al.; "Efficient Mode Converter for Coupling between Fiber and Micrometer Size Silicon Waveguides"; 2007 4th IEEE International Conference on Group IV Photonics (2007); pp. 49-51.
Coldren et al.; "Tunable Semiconductor Lasers: A Tutorial"; Journal of Lightwave Technology, Jan. 2004; 22(1):193-202.
Coldren; "Monolithic Tunable Diode Lasers"; IEEE Journal on Selected Topics in Quantum Electronics, Nov./Dec. 2000; 6(6):988-999.
Hildebrand, et al.; "The Y-Laser: A Multifunctional Device for Optical Communication Systems and Switching Networks"; Journal of Lightwave Technology, Dec. 1993; 11(12):2066-2075.
Isaksson, et al.; "10 Gb/s Direct Modulation of 40 nm Tunable Modulated-Grating Y-branch Laser"; in Optical Fiber Communication Conference and Exposition and the National Fiber Optic Engineers Conference, Technical Digest (CD) (Optical Society of America, 2005), paper OTuE2.
Khilo, A>, et al.; "Efficient Planar Fiber-to-Chip Coupler Based on Two-Stage Adiabatic Evolution"; Optics Express, vol. 18, No. 15 (2010); pp. 15790-15806.
Kuznetsov, et al.; "Asymmetric Y-Branch Tunable Semiconductor Laser with 1.0 THz Tuning Range"; IEEE Photonics Technology Letters, Oct. 1992; 4(10):1093-1095.
Laroy, et al.; "Characteristics of the New Modulated Grating Y laser (MG-Y) for Future WDM Networks"; Proceedings Symposium IEEE/LEOS Benelux Chapter, 2003, Enschede, pp. 55-58, retrieved from the Internet: <http://leosbenelux.org/symp03/s03p055.pdf>.
Laroy; "New Concepts of Wavelength Tunable Laser Diodes for Future Telecom Networks"; [dissertation] Universiteit Gent, 2006 [in Dutch and English], 162 pages.
Laroy; "New Widely Tunable Laser Concepts for Future Telecommunication Networks"; FTW-symposium, Belgium, 2002; retrieved from the Internet: <http://photonics.intec.ugent.be/download/pub_1625.pdf>, 2 pages total.
Lumerical Knowledge Base; "Evanescent Waveguide Couplers"; Web. Mar. 6, 2015; <https://kb.lumerical.com/en/pic_passive_waveguide_couplers_evanescent.html>.
Magno, et al.; "Multiphysics Investigation of Thermo-optic Effect in Silicon-on-Insulator Waveguide Arrays"; Excerpt from the Proceedings of the COMSOL ers Conference 2006, retrieved from the Internet: <http://cds.comsol.com/access/dl/papers/1628/Magno.pdf>, 6 pages total.
Morthier, et al.; "New Widely Tunable Edge-Emitting Laser Diodes at 1.55 μm Developed in the European IST-project NEWTON"; Semiconductor and Organic Optoelectronic Materials and Devices. Edited by Zah, Chung-En; Luo, Yi; Tsuji, Shinji. Proceedings of the SPIE, 2005; 5624:1-8; retrieved from the Internet: <http://photonics.intec.ugent.be/download/pub_1800.pdf>.
Morthier; "Advanced Widely Tunable Edge—Emitting Laser Diodes and Their Application in Optical Communications"; [presentation], Ghent University—IMEC, 2000, 23 pages total. Can be retrieved from the Internet: <broadband02.ici.ro/program/morthier_3a.ppt>.
Morthier; "New Widely Tunable Lasers for Optical Networks"; NEWTON Project No. IST-2000-28244, Dec. 2001; retrieved from the Internet: <http://www.ist-optimist.unibo.it/pdf/network/projects_public/NEWTON/Deliverables/D01.pdf>, 5 pages total.
Park, H., et al.; "A fiber-to-Chip Coupler Based on Si/SiON Cascaded Tapers for Si Photonic Chips"; Optics Express, vol. 21, No. 24 (2013); pp. 29313-29319.
Yamada, K.; "Chapter 1: Silicon Photonic Wire Waveguides: Fundamentals and Applications"; Silicon Photonics II, Topics in Applied Physics 119 (2011); pp. 1-29.
Passaro, et al.; "Investigation of Thermo-Optic Effect and Multireflector Tunable Filter/Multiplexer in SOI Waveguides"; Optics Express, May 2, 2005; 13(9):3429-3437.
Wesström, et al.; "Design of a Widely Tunable Modulated Grating Y-branch Laser ing the Additive Vernier Effect for Improved Super-Mode Selection"; IEEE 18th International Semiconductor Laser Conference, 2002, 99-100; retrieved from the Internet: <http://photonics.intec.ugent.be/download/pub_1603.pdf>.
Wesström, et al.; "State-of-the-Art Performance of Widely Tunable Modulated Grating Y-Branch Lasers"; Optical Fiber Communication Conference, Technical Digest (CD) (Optical Society of America, 2003), paper TuE2., all pages.
PCT/US2012/052913, "International Preliminary Report on Patentability", dated Mar. 13, 2014, all pages.
PCT/US2012/052913, "International Search Report and Written Opinion", dated Nov. 16, 2012, all pages.
PCT/US2014/059900, "International Search Report and Written Opinion", dated Jan. 22, 2015, all pages.
PCT/US2014/059900, "International Search Report on Patentability", dated Apr. 21, 2016, all pages.
PCT/US2015/014801, "International Preliminary Report on Patentability", dated Aug. 18, 2016, all pages.
PCT/US2015/014801, "International Search Report and Written Opinion", dated May 11, 2015, all pages.
PCT/US2015/019430, "International Preliminary Report on Patentability", dated Sep. 22, 2016, all pages.
PCT/US2015/019430, "International Search Report and Written Opinion", dated May 29, 2015, all pages.
PCT/US2015/032725, International Preliminary Report on Patentability dated Dec. 8, 2016, all pages.
PCT/US2015/032725, "International Search Report and Written Opinion", dated Aug. 27, 2015, all pages.
PCT/US2016/028431, "International Search Report and Written Opinion", dated Jul. 28, 2016, all pages.
European Supplemental Search Report dated Apr. 9, 2015 for International Patent Application No. 12827040.2-1553 filed on Aug. 29, 2012, all pages.
Non-Final Office Action dated Sep. 2, 2014 for U.S. Appl. No. 13/597, 117; all pages.
First Action Interview Pilot Program Pre-Interview Communication dated Aug. 25, 2016 for U.S. Appl. No. 14/615, 942; all pages.
Notice of Allowance dated Dec. 14, 2016 for U.S. Appl. No. 14/615,942; all pages.
Final Office Action dated Feb. 22, 2016 for U.S. Appl. No. 14/642,429; all pages.
Non-Final Office Action dated Oct. 27, 2015 for U.S. Appl. No. 14/642,429; all pages.
Notice of Allowance dated Jun. 15, 2016 for U.S. Appl. No. 14/642,429; all pages.
Notice of Allowance dated Sep. 27, 2017 for U.S. Appl. No. 14/772,970; 6 pages.
Non-Final Office Action dated Jan. 26, 2017 for U.S. Appl. No. 14/722,970, 6 pages.
Selected file history U.S. Appl. No. 14/642,429, dated Mar. 9, 2015, all pages.
Notice of Allowance dated Jan. 18, 2017 for U.S. Appl. No. 14/722,983; all pages.
Restriction Requirement dated Jul. 22, 2016 for U.S. Appl. No. 14/722, 983; all pages.
Supplemental Notice of Allowance dated Feb. 1, 2017 for U.S. Appl. No. 14/722, 983; all pages.
U.S. Appl. No. 14/722, 983 received a Supplemental Notice of Allowance dated Apr. 24, 2017, all pages.
U.S. Appl. No. 15/051,348 received a Notice of Allowance dated Jan. 19, 2018, 5 pages.
U.S. Appl. No. 15/051,348 received a Non-Final Office Action dated May 19, 2017, 10 pages.
U.S. Appl. No. 15/051,348 received a Restriction Requirement dated Jan. 27, 2016, 5 pages.
U.S. Appl. No. 15/485,858 received a Notice of Allowance dated Nov. 20, 2017, 7 pages.
U.S. Appl. No. 15/487,918 received a Notice of Allowance dated Feb. 14, 2018, 9 pages.

(56) References Cited

OTHER PUBLICATIONS

Non-Final Office Action dated Mar. 7, 2017 for U.S. Appl. No. 15/133,898; all pages.
Notice of Allowance dated Jul. 26, 2017 for U.S. Appl. No. 15/133,898; all pages.
Non-Final Office Action dated Jun. 16, 2017 for U.S. Appl. No. 15/133, 920; all pages.
Non-Final Office Action dated Jun. 2, 2017 for U.S. Appl. No. 15/588, 128; all pages.
Non-Final Office Action dated Oct. 6, 2016 for U.S. Appl. No. 15/133, 920; all pages.
Notice of Allowance dated Jan. 25, 2017 for U.S. Appl. No. 15/262,937; all pages.
Restriction Requirement dated Oct. 6, 2016 for U.S. Appl. No. 15/133,898; all pages.
U.S. Appl. No. 15/980,536, filed May 15, 2018 received a Non-Final Office Action, dated Sep. 28, 2018, 11 pages.
CN201580016484.1 received an Office Action, dated Mar. 21, 2019, 12 pages.
U.S. Appl. No. 15/980,536 received a Notice of Allowance, dated Feb. 28, 2019, 5 pages.
CN201580016484.1 received a Third Office Action dated Sep. 12, 2019, 14 pages.
U.S. Appl. No. 16/428,193 received a Notice of Allowance dated May 5, 2020. 9 pages.

\* cited by examiner

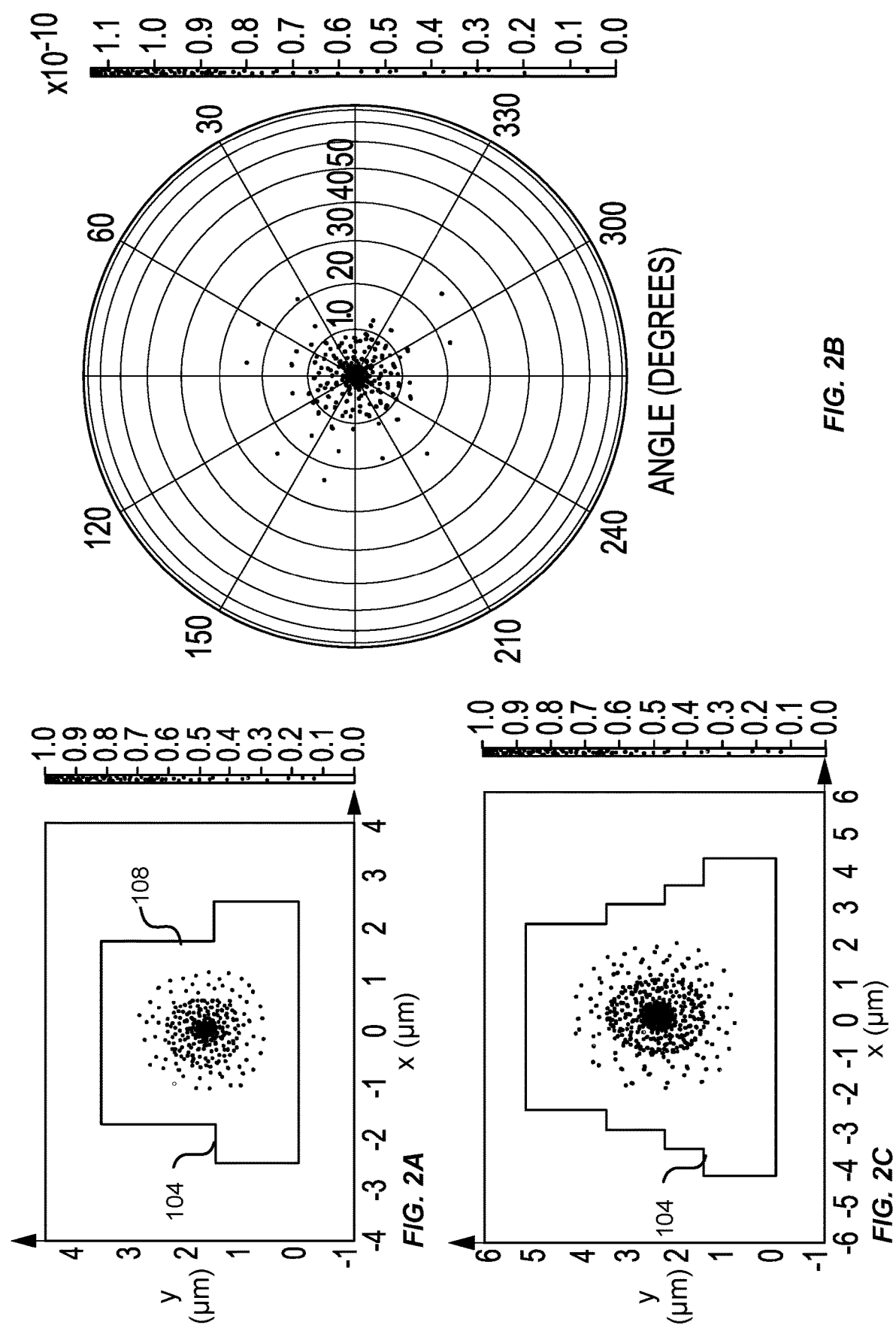

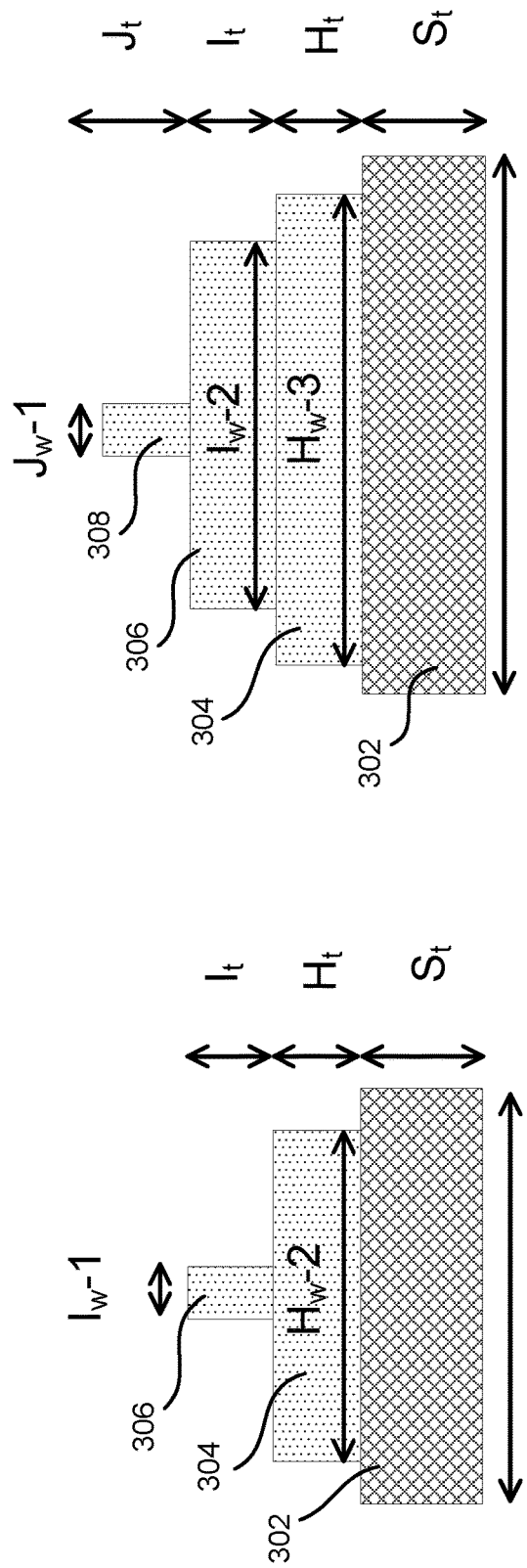
FIG. 3E
FIG. 3D
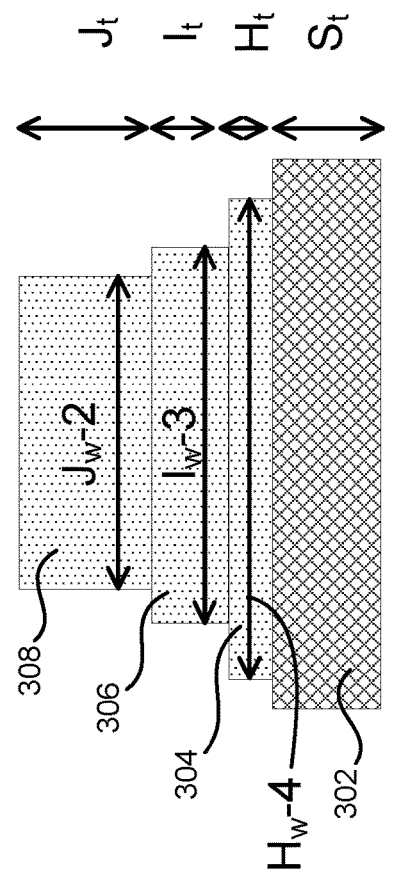
FIG. 3F

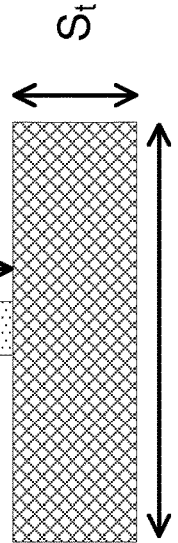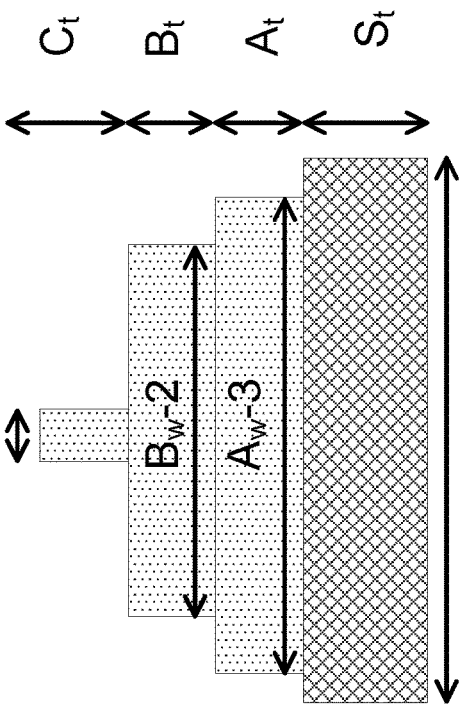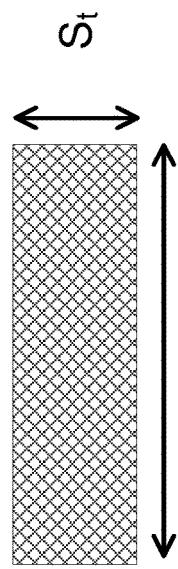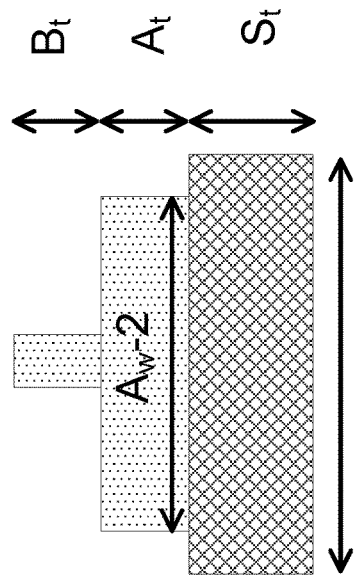

Stage 5 start

Stage 4 start

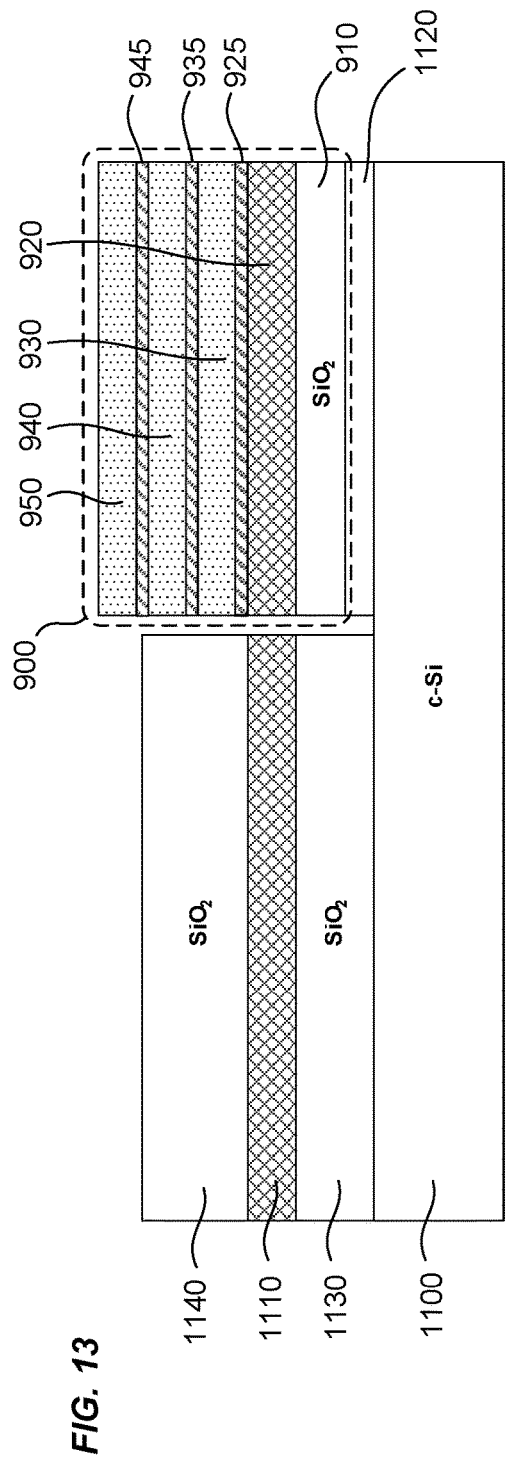
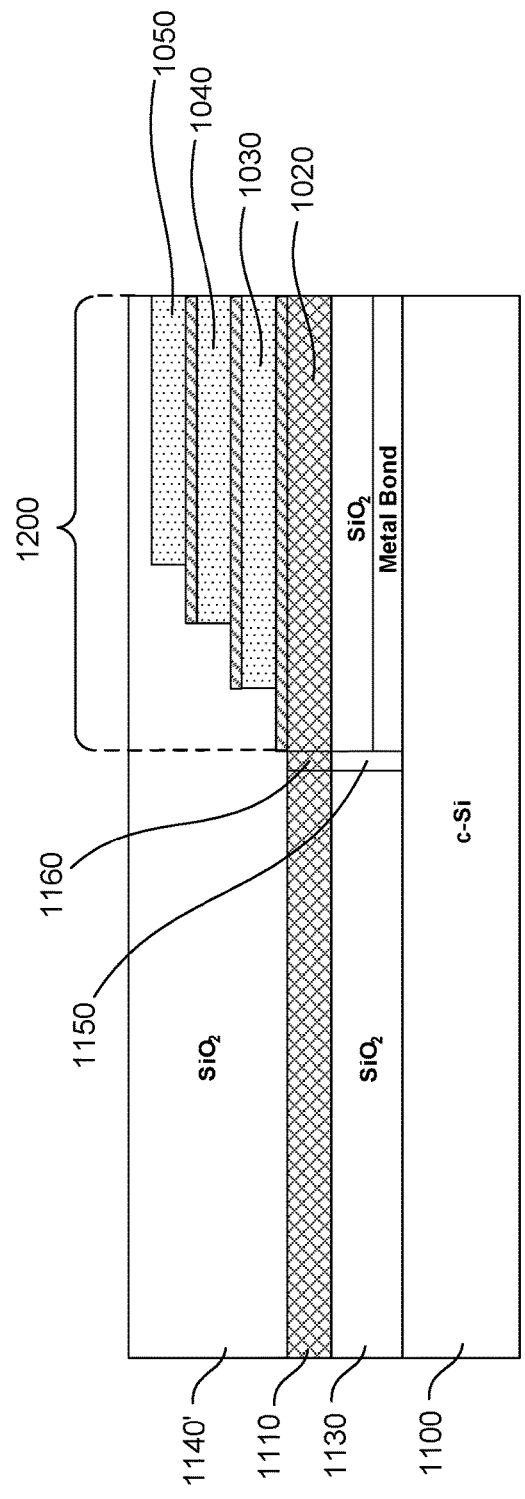
FIG. 13
FIG. 14

INTEGRATED PHOTONICS MODE EXPANDER

CROSS-REFERENCE TO RELATED APPLICATION

This application is a divisional application of U.S. patent application Ser. No. 15/051,348, filed on Feb. 23, 2016, entitled "Integrated Silicon Photonics Mode Expander," which claims the benefit of priority of U.S. Provisional Patent Application No. 62/119,750, filed on Feb. 23, 2015, entitled "Integrated Silicon Photonics Mode Expander." U.S. patent application Ser. No. 15/051,348 is also a continuation-in-part of U.S. patent application Ser. No. 14/722,970, filed on May 27, 2015, now U.S. Pat. No. 9,885,832, issued on Feb. 6, 2018, which claims the benefit of priority of U.S. Provisional Patent Application Nos. 62/003,404, filed on May 27, 2014, and 62/044,867, filed on Sep. 2, 2014. The disclosures of all of the above-identified patent applications are hereby incorporated by reference in their entireties for all purposes.

This application is related to the following U.S. patent applications: U.S. patent application Ser. No. 14/509,914, filed Oct. 8, 2014, which claims the benefit of priority of U.S. Provisional Patent Application Nos. 62/028,611, filed on Jul. 24, 2014, and 61/888,863, filed on Oct. 9, 2013; U.S. patent application Ser. No. 14/482,650, filed Sep. 10, 2014, which is a continuation of U.S. patent application Ser. No. 13/745,577, filed Jan. 18, 2013, now U.S. Pat. No. 9,077,846, which claims the benefit of priority of U.S. Provisional Patent Application No. 61/588,080, filed on Jan. 8, 2012; U.S. patent application Ser. No. 14/996,001, filed Jan. 14, 2016, which is a continuation of U.S. patent application Ser. No. 14/755,545, filed Jun. 30, 2015, which is a continuation of U.S. patent application Ser. No. 13/597,117, filed Aug. 28, 2012, now U.S. Pat. No. 9,097,846, which claims the benefit of priority of U.S. Provisional Patent Application No. 61/528,938, filed on Aug. 30, 2011; and U.S. patent application Ser. No. 14/615,942, filed Feb. 6, 2015, which claims the benefit of priority of U.S. Provisional Patent Application No. 61/936,799, filed on Feb. 6, 2014. The disclosures of all of the above-identified patent applications are hereby incorporated by reference in their entireties for all purposes.

BACKGROUND

This application relates to optical waveguides. More specifically, and without limitation, certain embodiments herein modify spatial profiles of transmitted optical modes, for example to help optically couple a thin waveguide with an optical fiber.

Photonic devices, including optical waveguides, are being integrated on semiconductor chips. Certain ones of such chips are called herein Silicon Photonics (SiP) chips. Photonic devices integrated on semiconductor chips are often designed for use in fiber-optic communication systems.

SUMMARY OF THE INVENTION

This application discloses embodiments of a mode expander used to couple a smaller optical mode in a semiconductor waveguide to a larger mode in an optical fiber.

In an embodiment, a method of fabricating a waveguide mode expander includes providing a substrate including a waveguide. The waveguide defines a waveguide thickness and terminates at an output end, and supports an optical mode of an initial mode size at the output end. The method further includes forming a mounting region adjacent the output end of the waveguide, and providing a multi-layer chiplet including one or more optical materials. A first layer of the one or more optical materials defines a first layer thickness that supports an input optical mode size substantially the same size as the initial mode size. One or more overlying layers define thicknesses that, when combined with the first layer, support an output optical mode size that is larger than the initial mode size. The method further includes bonding the chiplet in the mounting region and selectively removing portions of the chiplet to form tapered stages that successively increase in number and lateral size from a proximal end of the chiplet adjacent the waveguide, to a distal end of the chiplet, each tapered stage being formed of a portion of a respective layer of the multi-layer chiplet. The first layer and the tapered stages form a waveguide mode expander that expands an optical mode of light traversing the chiplet, from the initial optical mode size entering the proximal end, to the output optical mode size at the distal end.

In an embodiment, a waveguide mode expander includes a tapered shoulder portion formed of a first layer of a high bandgap semiconductor material. The first layer defines a thickness. The shoulder portion forms a length from an input end to an output end, a first width at the input end, and a second width that is larger than the first width, at the output end. The waveguide mode expander also includes a tapered ridge portion, overlying the shoulder portion and formed of one or more additional tapered portions of high bandgap semiconductor materials. Each of the additional portions is formed of an additional layer having an individual layer thickness. Each of the additional portions forms a sequentially shorter length than the length of the shoulder portion and the length of any underlying additional portions, a first additional portion width at an end of the additional portion that is closest to the input end, and a second additional portion width that is larger than the first additional portion width, at the output end. The tapered ridge portion and the tapered shoulder portion are configured to expand an optical beam propagating through the waveguide mode expander from the input end to the output end.

BRIEF DESCRIPTION OF THE DRAWINGS

FIGS. 2A-2C depict simulations of mode confinement in a mode expander and an optical fiber.

FIGS. 3A-3F depict views of an embodiment of a mode expander having multiple stages.

FIGS. 4A-4F depict cross sections of another embodiment of a mode expander having multiple stages.

FIG. 13 schematically illustrates, in a side view, the engineered chiplet of FIG. 9 coupled with an SOI substrate having a waveguide fabricated thereon, before photolithography and etching steps used to form a mode expander, according to an embodiment.

FIG. 14 schematically illustrates, in a side view, a mode expander fully processed and integrated with a waveguide on an SOI substrate, according to an embodiment.

DETAILED DESCRIPTION OF SPECIFIC EMBODIMENTS

Figure 1A:
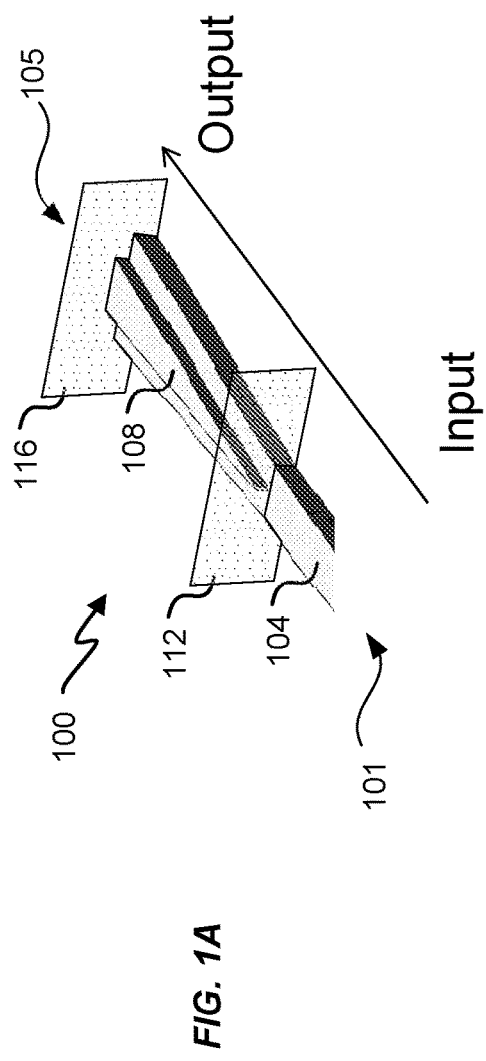
FIGS. 1A-1C depict diagrams of an embodiment of a single-stage mode expander using polycrystalline silicon on top of a crystalline-silicon waveguide.

Embodiments herein generally relate to mode expanders that couple a semiconductor waveguide to an optical fiber. The waveguide may be formed of silicon or other optical materials such as III-V or II-VI compound semiconductors, including ternary or quaternary alloys thereof. Mode expanders are used to increase coupling efficiency and reduce alignment and assembly costs when coupling light between the waveguides of chip-based devices (e.g., Silicon Photonics (SiP) devices) fabricated on wafers (e.g., Silicon on Insulator (SOI) wafers) and single-mode optical fibers. The increased coupling efficiency and reduced costs are due to the significantly smaller optical mode of the waveguides on the SOI wafer. A mode expander according to embodiments herein can be fabricated by creating successive stages, which are laterally tapered layers of semiconductor material into which an optical mode can expand as it propagates. To minimize optical losses associated with mode expanders, the thicknesses of the layers forming these successive individual stages are accurately controlled using the techniques herein.

Certain embodiments herein are generated using various phases of silicon as the semiconductor material, and are described first in connection with FIGS. 1-4F, however the techniques are applicable to III-V and II-VI semiconductor materials, and ternary and quaternary alloys thereof. Other embodiments herein integrate engineered chiplets into a Silicon Photonics wafer, using a bonding process such as template assisted bonding. The engineered chiplets are then processed to form mode expanders. The engineered chiplets should be of height and size to enable the mode expanders to be fabricated from the chiplets. For example, a suitable engineered chiplet may be a block of material with appropriate layers, which can be selectively etched back to form the layers into a shape that acts as a mode expander, as described below in connection with FIGS. 8A-16. In some embodiments, the engineered chiplets include etch stop layers that help to enable definition thicknesses of the layers forming the successive stages of the mode expander with high accuracy. It is also possible to deposit stage and etch stop layers directly onto a Silicon Photonics wafer and fabricate the mode expander entirely in situ.

The present disclosure and appended claims use relative position terminology such as "up," "down," "above," "below," "height," "depth," "overlying," "underlying," "top," "bottom" and the like. All such terms are to be understood in the context of the structures shown in FIGS. 1A-1C, 2A, 2C, 3B-3F, 4A-4F, 9-11 and 13-16 in the orientation in which these drawings are shown. That is, with reference to FIG. 9 for example, layer 950 is the uppermost or top layer, and is above layer 945, layer 910 is the bottom layer and is below layer 904, $C_t$, $B_t$, $A_t$ and $S_t$ all refer to layer heights or thicknesses, and the like. Also, the drawings are not to any particular scale, and features therein may not be drawn in proportion to one another, but may be exaggerated for clarity of illustration.

Figure 1C:
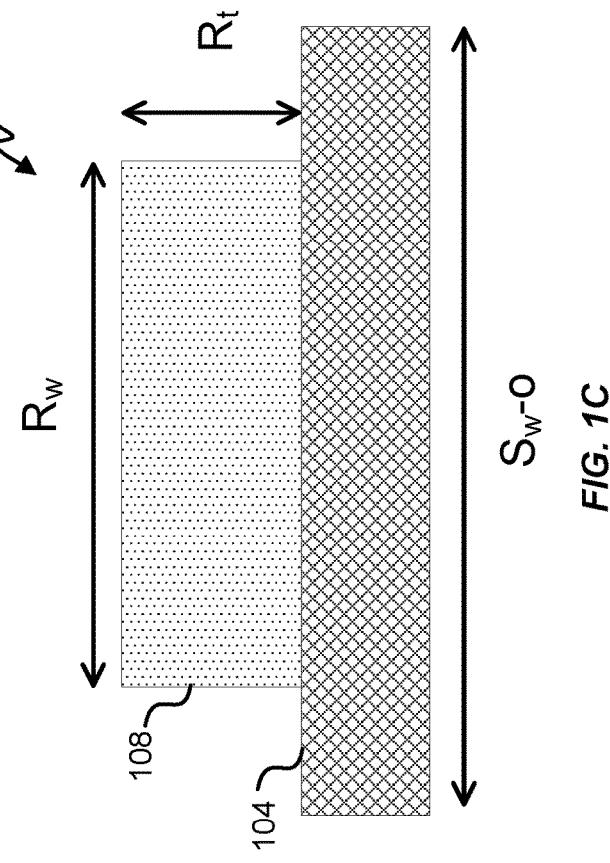
Figure 1B:
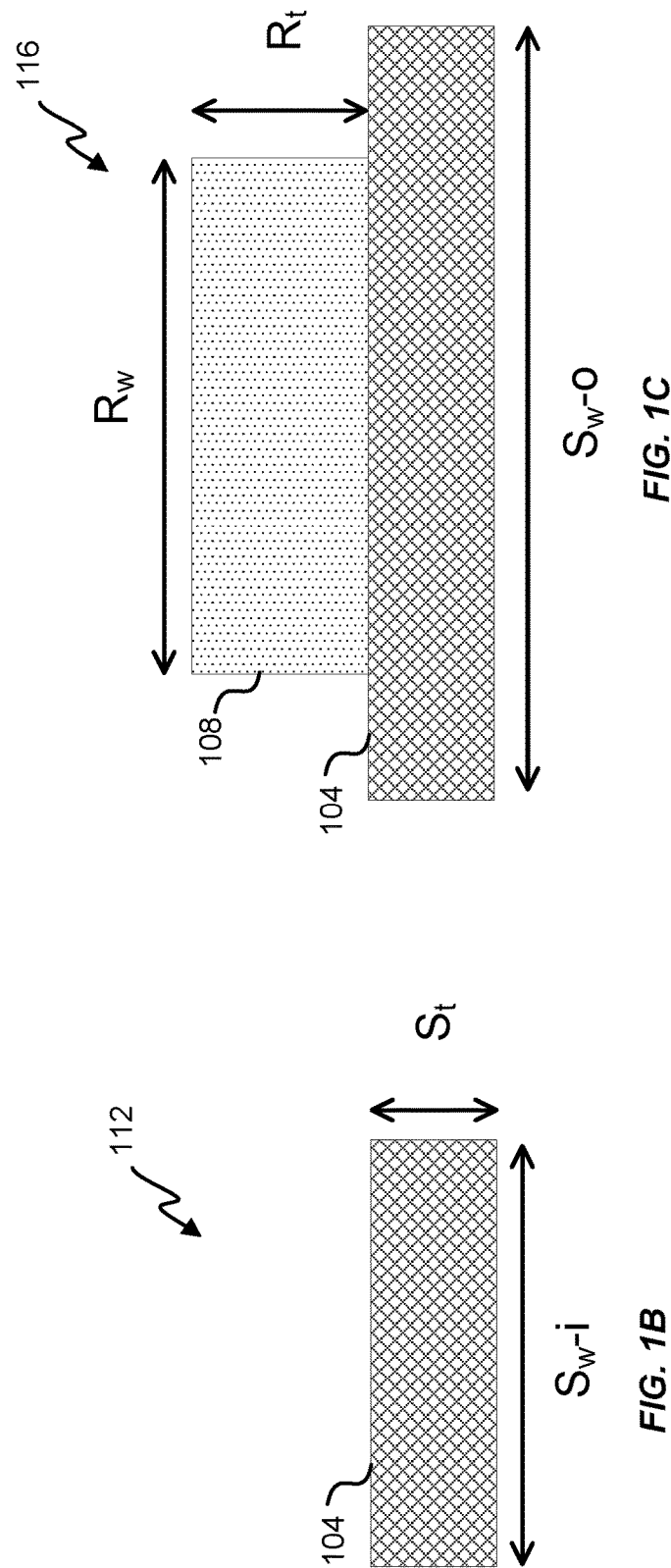

Referring first to FIGS. 1A-1C, an embodiment of a mode expander 100 that includes a ridge 108 on top of a shoulder 104 is shown. Mode expander 100 defines an input end 101 and an output end 105 along a direction of light propagation indicated by an arrow. In some embodiments, input end 101 is coupled to a waveguide having a rectangular cross section. In other embodiments, the waveguide has a cross section that is not rectangular (e.g., a trapezoidal or inverted 'T' shape with a crystalline-silicon ridge on top of a crystalline-silicon shoulder). Output end 105 is configured for coupling to an optical fiber that typically has a round cross section (e.g., an optical fiber having normal or high Numerical Aperture (NA)). Also illustrated in FIG. 1A are locations of a cross sectional plane 112 of the single stage mode expander 100 near input end 101 and a cross sectional plane 116 at output end 105.

In this embodiment, both the shoulder 104 and the ridge 108 taper from the output end to the input end so that a beam that is transmitted from the input end to the output end expands. For example, a beam may be transmitted from a smaller waveguide, through input end 101 of mode expander 100, through output end 105 of mode expander 100, and to a larger optical fiber. In some embodiments, as the beam propagates through the single-stage mode expander 100, the beam expands adiabatically.

In FIG. 1B, a cross sectional plane 112 near the input end of the single-stage mode expander 100 is shown. Cross sectional plane 112, in this embodiment, includes shoulder 104 that has a thickness, $S_t$, and a width, $S_w$. Width $S_w$ is a particular case of a more general notation $S_w$-n where n is an index that denotes position of cross section within mode expander 100, i denotes an initial position, and other values of n denote other positions. Thus, shoulder 104 has an input width $S_w$-i at cross sectional plane 112 near input end 101 of the mode expander 100. Input width $S_w$-i of shoulder 104 ranges between 0.2 and 5 µm (e.g., 0.2, 0.5, 1, 2, 3, 4, or 5 µm). Thickness $S_t$ of shoulder 104 ranges between 0.2 and 5 µm (e.g., 0.2, 0.5, 1.0, 1.5, 2, 3, or 5 µm). In certain embodiments, shoulder 104 is made of crystalline silicon (c-Si), and in some of these embodiments, shoulder 104 is simply an extension of a waveguide grown on a substrate (e.g., a substrate including silicon on insulator and/or $SiO_2$). In other embodiments, shoulder 104 is formed of a high bandgap semiconductor other than Si, for example a III-V or II-VI semiconductor, as discussed further below.

In FIG. 1C, a cross sectional plane 116 near the output end of the single-stage mode expander 100 is shown. The cross sectional plane 116 near the output end of the single-stage mode expander 100 forms cross sections of the shoulder 104 and the ridge 108. The thickness of the shoulder $S_t$ remains relatively constant from the cross sectional plane 112 near the input end to the cross sectional plane 116 near the output end. The width of the shoulder, $S_w$, expands to an output width of the shoulder $S_w$-o at output end 105. In this embodiment, the output width of the shoulder $S_w$-o ranges between 2 and 50+µm (e.g., 2, 3, 4, 5, 6, 8, 10, 25, or 50+ µm). In some embodiments, the width of the shoulder at the output end $S_w$-o is not critical because a beam is confined laterally by the ridge 108. Thus the width of the shoulder at the output end $S_w$-o, in some embodiments, is greater than 4.5 µm (e.g., $S_w$-o=5≈∞ for confinement of a beam).

Ridge 108, in the embodiment of FIGS. 1A-1C, consists of a single stage, and this embodiment may be considered a single-stage mode expander. In other embodiments, as discussed below, a ridge includes more than one layer or stage, so that for certain cross sections perpendicular to the propagation direction of a mode expander, the ridge has varying widths (e.g., as discussed later in reference to FIGS. 3A-3F and 4A-4F). The ridge 108 in the single-stage mode expander 100 has a thickness, $R_t$, and a width, $R_w$. The thickness of the ridge $R_t$ at the output end ranges from 0.2 to 10 µm (e.g., 0.2, 0.5, 1, 2, 3, 5, 7, or 10 µm). And in some embodiments, the width of the ridge $R_w$ ranges between 0.2 and 10 µm (e.g., 0.2, 0.5, 1, 2, 2.5, 3, 3.5, 4, 5, 7, or 10 µm). Additionally, in some embodiments, a length of the single-stage mode expander 100 varies between 25 and 500 µm (e.g., 25, 50, 75, 100, 150, 200, 250, 300, 400, or 500 µm).

Ridge 108, in some embodiments, is made of polycrystalline silicon (also referred to as poly-Si or polysilicon) instead of crystalline silicon. In crystalline silicon, a lattice structure is well defined, and the crystalline-silicon structure is essentially a single crystal. In polycrystalline silicon, the polycrystalline-silicon structure includes multiple crystals, that is, lattice structures are only locally defined for each of the crystals. In some embodiments, though polysilicon may have more loss than crystalline silicon, polysilicon is used for manufacturing reasons (e.g., for manufacturing tolerances and as discussed later in reference to FIGS. 5A-5G). Another advantage of polysilicon, in some embodiments, is that polysilicon has a stable and predictable index of refraction that is similar to crystalline silicon (e.g., the ridge portion has a first index of refraction; the shoulder portion has a second index of refraction; and the first index of refraction minus the second index of refraction is less than 0.05, 0.1, 0.2, or 0.3). In other embodiments, ridge 108 is formed of a high bandgap semiconductor other than Si, for example a III-V or II-VI semiconductor, as discussed herein.

Referring next to FIGS. 2A-2C, simulations of beam confinements are shown. In FIG. 2A, a simulated profile of a beam at an output of a single-stage mode expander is shown. In some embodiments, a beam divergence angle and/or a large spot size are preferred. For example, a beam divergence (half angle) of less than 30, 25, 20, 15, or 10 degrees is targeted. In the simulation in FIG. 2A, a beam divergence of about 15 degrees was calculated. In FIG. 2A, a spot size of 2.6 µm in the vertical direction (y-axis) and about 2.8 µm in the horizontal direction (x-axis) is shown (beam size being measured to $1/e^2$ of peak intensity). In FIG. 2B, a simulation of an optical beam confined in a high NA fiber is shown. In FIG. 2C, a simulated profile of a beam at an output of a triple-stage mode expander is shown. In some embodiments, having a cross section roughly rectangular is targeted to assist in matching an optical mode of a coupler with an optical mode of an optical fiber.

Referring to FIGS. 3A-3F, cross sections of an embodiment of a mode expander 300 with multiple stages is shown. Though this embodiment has three stages, other embodiments may have fewer or more stages. FIGS. 3A-3F show successive cross sections of mode expander 300, going from an input end (e.g., where mode expander 300 couples with a semiconductor waveguide 302) of the mode expander toward an output end (e.g., coupling to an optical fiber). The mode expander includes a shoulder portion 304, a first stage 308, a second stage 312, and a third stage 316. In some embodiments, first stage 308, second stage 312, and third stage 316 are made of polysilicon, and reference will be made to this embodiment including crystalline silicon and/or polysilicon, although it is contemplated that other semiconductors may be utilized, as discussed herein.

Figure 3B:
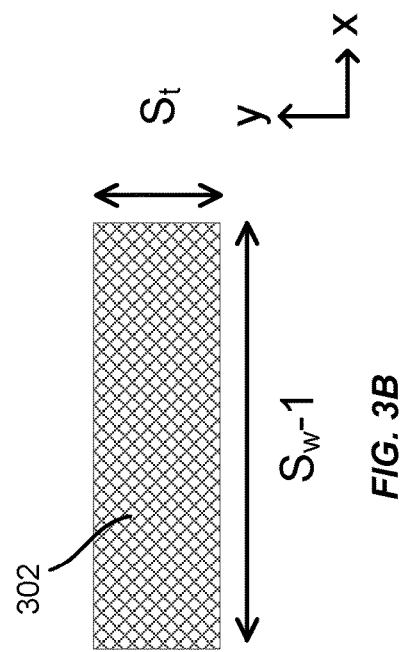
Figure 3C:
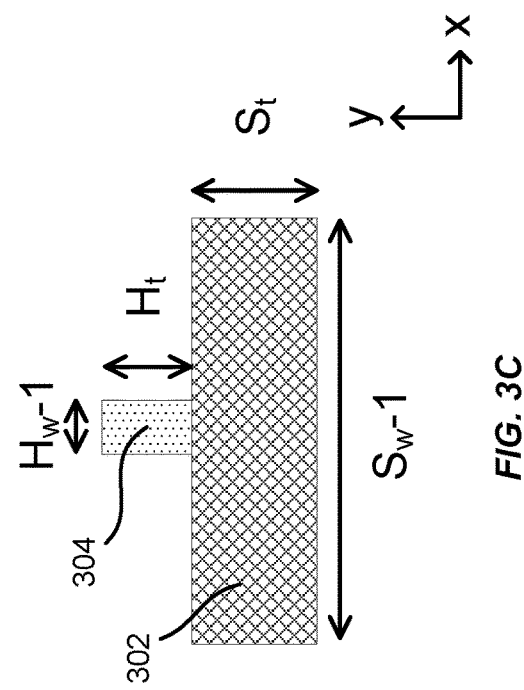
Figure 3A:
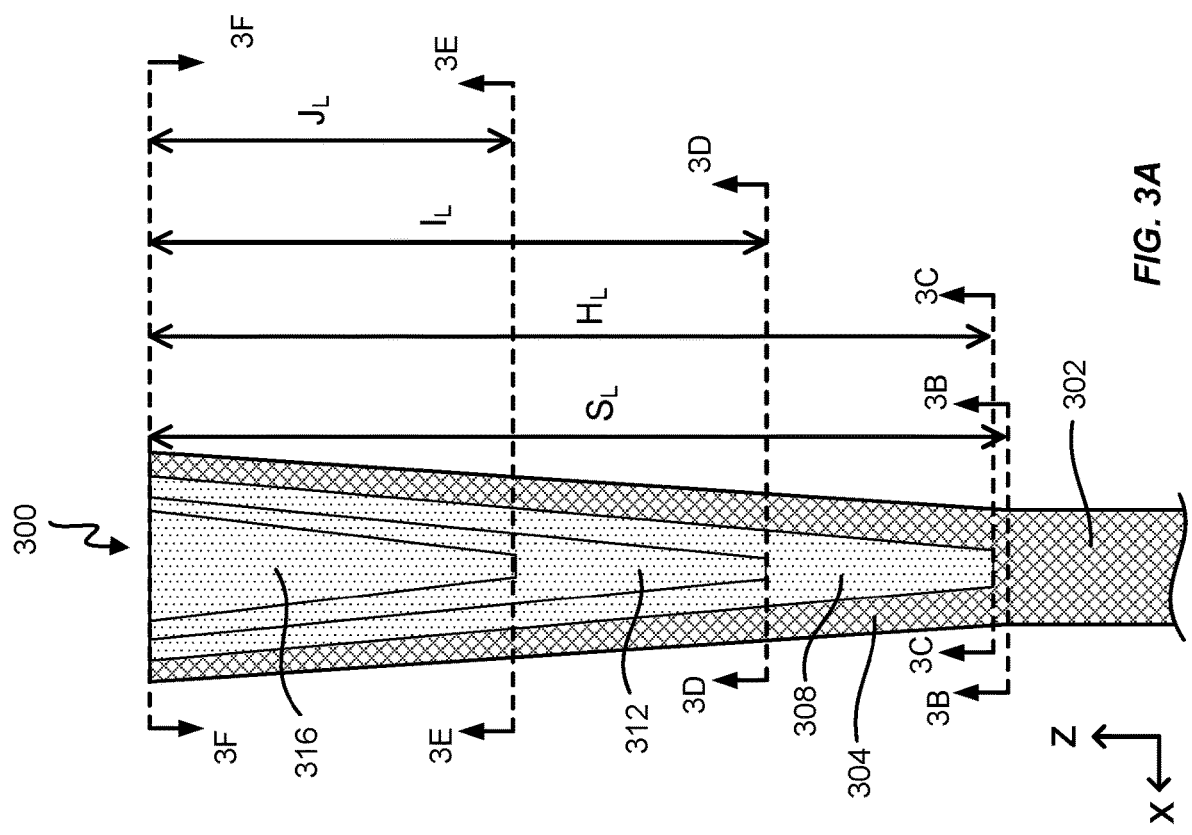

In FIG. 3A, a three-stage mode expander 300 is shown. The three-stage mode expander 300 includes a shoulder portion 304 and a ridge including a first stage 308, a second stage 312, and a third stage 316. Though tapers of the first stage 308, the second stage 312, and the third stage 316 have a substantially isosceles-triangle shape (i.e., $z \approx n|x|$), other shapes could be used. For example, a taper could be substantially parabolic shaped (e.g., $z \approx x^2$; or $z \approx |x|^n$), or substantially funnel shaped (e.g., $z \approx \pm \ln(|x|)$; or $z \approx \pm \log_n(|x|)$), where n is not constrained to be an integer. Further, tapers for each stage could have a different shape. In FIG. 3A, the shoulder 304 has a length, $S_L$, the first stage 308 has a length, $H_L$, the second stage 312 has a length, $I_L$, and the third stage 316 has a length, $J_L$. In some embodiments, $S_L = H_L$. FIG. 3A also designates cross sectional lines 3B-3B, 3C-3C, 3D-3D, 3E-3E and 3F-3F as the locations of the cross-sectional planes illustrated in FIGS. 3B, 3C, 3D, 3E and 3F respectively.

FIG. 3B depicts a first cross section of the three-stage mode expander 300 showing the shoulder 304. The shoulder 304 in the first cross section has a first width, $S_w$-1, and a shoulder thickness, $S_t$. In some embodiments, the first shoulder width $S_w$-1 and the shoulder thickness $S_t$ equal dimensions of a semiconductor waveguide that the mode expander is coupled to. In some embodiments, the dimensions of the first shoulder are chosen so that the size of the optical mode matches that in a semiconductor waveguide that the mode expander is coupled to. In some embodiments, the shoulder is an extension of the semiconductor waveguide. In some embodiments, the shoulder is made of crystalline silicon.

FIG. 3C depicts a second cross section of the three-stage mode expander 300. The second cross section shows a starting of the first stage 308 of the three-stage mode expander 300. The first stage 308 of the three-stage mode expander 300 has a first width, $H_w$-1, and a thickness, $H_t$.

FIG. 3D depicts a third cross section of the three-stage mode expander 300. The third cross section shows a starting of the second stage 312 of the three-stage mode expander 300. The second stage 312 of the three-stage mode expander 300 has a first width, $I_w$-1, and a thickness, $I_t$.

FIG. 3E depicts a fourth cross section of the three-stage mode expander 300. The fourth cross section shows a starting of the third stage 316 of the three-stage mode expander 300. The third stage 316 of the three-stage mode expander 300 has a first width, $J_w$-1, and a thickness, $J_t$.

FIG. 3F depicts a fifth cross section of the three-stage mode expander 300. The fifth cross section of the three-stage mode expander 300 is a cross section of the output end of the three-stage mode expander 300.

A table of dimensions of the shoulder and ridge in FIGS. 3A-3F is shown below. The ranges below are meant to be exemplary for the three-stage mode expander 300 in FIGS. 3A-3F, and not meant to limit the scope of the invention.

| Dimension | Example Range(s) (μm) | Example Values (μm) |
|---|---|---|
| $S_L$ | 50-1000; 200-500 | 300, 350, 400 |
| $S_t$ | 0.2-10; 1-4 | 1, 1.5, 2 |
| $S_w$-1 | 0.1-10; 1-4 | 1.5, 2, 2.5, 3 |
| $S_w$-2 | 0.1-10; 2-6 | 3, 4, 5 |
| $S_w$-3 | 0.1-10; 3-10 | 4, 5, 6, 7 |
| $S_w$-4 | 0.1-12; 6-12 | 6.5, 7.5, 8.5 |
| $H_L$ | 50-1000; 200-500 | 300, 350, 400 |
| $H_t$ | 0.2-10; 0.2-1.2 | 0.4, 0.6, 0.8, 1.0 |
| $H_w$-1 | 0.1-10; 0.2-1.2 | 0.4, 0.6, 0.8, 1.0 |
| $H_w$-2 | 0.1-10; 1-4 | 2, 3, 4 |
| $H_w$-3 | 0.1-10; 2-8 | 3, 4, 5 |
| $H_w$-4 | 0.1-11; 4-9 | 6, 6.5, 7 |
| $I_L$ | 25-750; 100-400 | 200, 250, 300 |
| $I_t$ | 0.2-10; 0.5-1.4 | 0.8, 1.2, 1.3, 1.4 |
| $I_w$-1 | 0.1-10; 0.4-0.8 | 0.6, 0.7, 0.8 |
| $I_w$-2 | 0.1-10; 1.5-6 | 2, 3, 3.5 |
| $I_w$-3 | 0.1-10; 3-8 | 4, 5, 6 |
| $J_L$ | 10-500; 50-250 | 140, 160, 180, 200 |
| $J_t$ | 0.2-10; 1-3 | 1.5, 1.7, 1.9, 2 |
| $J_w$-1 | 0.1-10; 0.6-1.5 | 0.8, 1.0, 1.2, 1.4 |
| $J_w$-2 | 0.1-10; 2-6 | 4.5, 5.0, 5.5 |

Referring to FIGS. 4A-4F, cross sections of an embodiment of a mode expander with multiple stages is shown. This embodiment has five stages, although other embodiments may have fewer or more stages. The FIGS. 4A-4F show successive cross sections of the mode expander going from an input end (e.g., coupling to a semiconductor waveguide) of the mode expander toward an output end (e.g., coupling to an optical fiber). The mode expander includes a first stage (A), a second stage (B), a third stage (C), a fourth stage (D), and a fifth stage (E). In some embodiments, the first stage, the second stage, the third stage, the fourth stage, and/or the fifth stage of the mode expander are mode of polysilicon.

FIG. 4A depicts a first cross section having a shoulder. The shoulder in the first cross section has a first width, $S_w$-1, and a shoulder thickness, $S_t$. In some embodiments, the first shoulder width $S_w$-1 and the shoulder thickness $S_t$ equal dimensions of a semiconductor waveguide that the mode expander is coupled to. In some embodiments, the shoulder is an extension of the semiconductor waveguide. In some embodiments, the shoulder is made of crystalline silicon, and reference will be made to this embodiment including crystalline silicon and/or polysilicon, although it is contemplated that other semiconductors may be utilized, as discussed herein. The shoulder has a first width $S_w$-1.

FIG. 4B depicts a second cross section of the mode expander. The second cross section shows a starting of the first stage of the mode expander. The first stage of the mode expander has a first width, $A_w$-1, and a thickness, $A_t$.

FIG. 4C depicts a third cross section of the mode expander. The third cross section shows a starting of the second stage of the mode expander. The second stage of the mode expander has a first width, $B_w$-1, and a thickness, $B_t$.

FIG. 4D depicts a fourth cross section of the mode expander. The fourth cross section shows a starting of the third stage of the mode expander. The third stage of the mode expander has a first width, $C_w$-1, and a thickness, $C_t$.

Figure 4F:
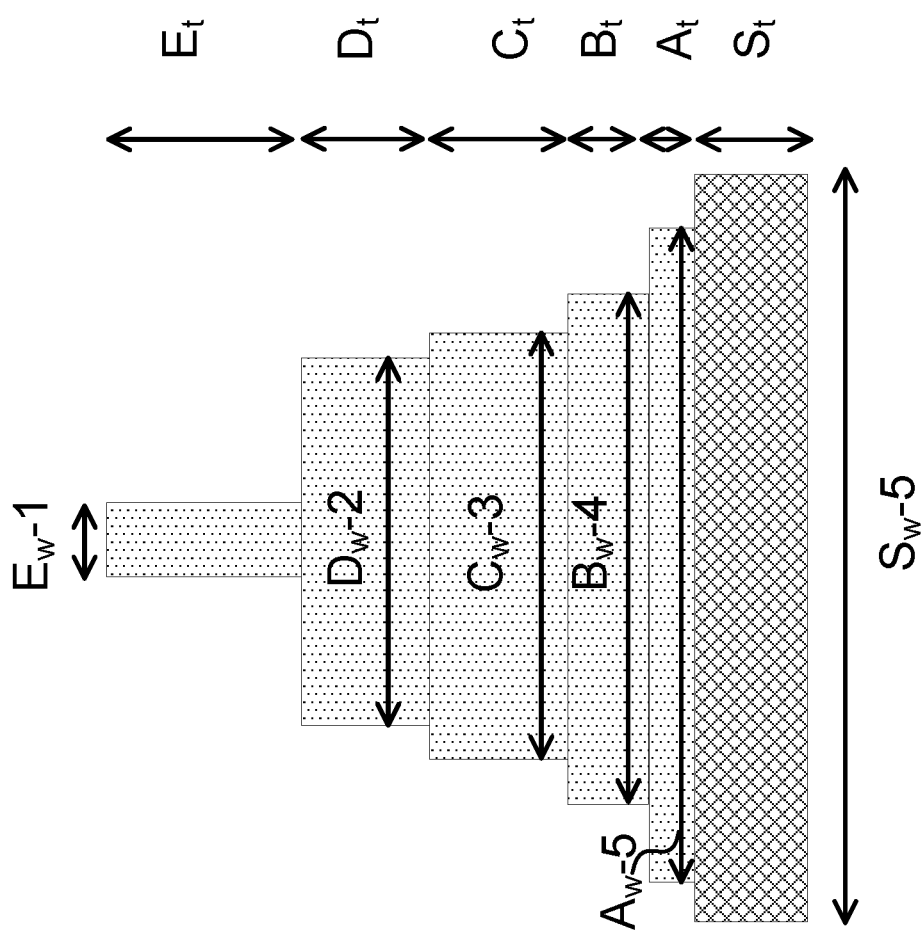
Figure 4E:
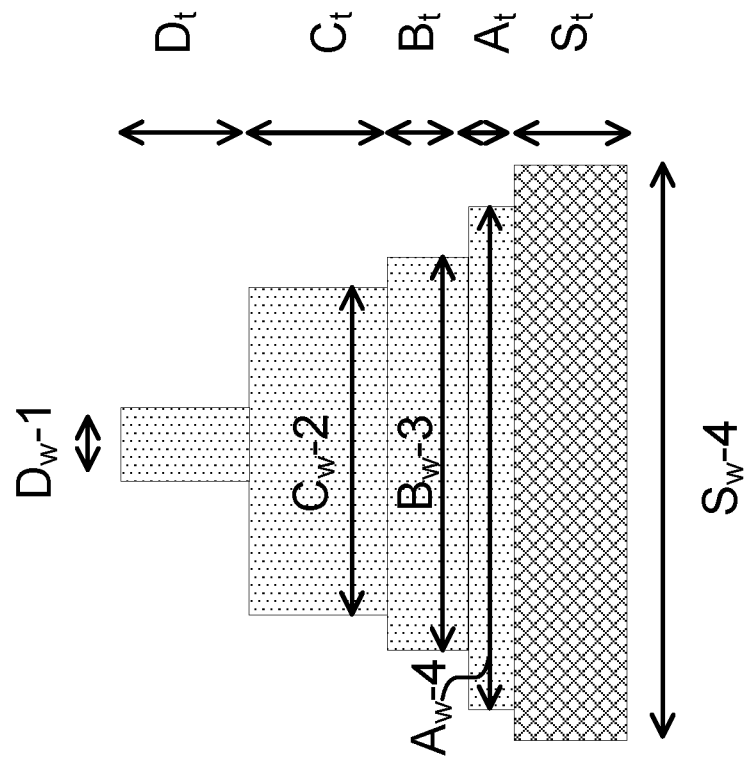

FIG. 4E depicts a fifth cross section of the mode expander. The fifth cross section shows a starting of the fourth stage of the mode expander. The fourth stage of the mode expander has a first width, $D_w$-1, and a thickness, $D_t$.

FIG. 4F depicts a sixth cross section of the mode expander. The sixth cross section shows a starting of the fifth stage of the mode expander. The fifth stage of the mode expander has a first width, $E_w$-1, and a thickness, $E_t$. It is noted that in this and some other embodiments that $S_w$-1<$S_w$-2<$S_w$-3<$S_w$-4<$S_w$-5; $A_w$-1<$A_w$-2<$A_w$-3<$A_w$-4<$A_w$-5; $B_w$-1<$B_w$-2<$B_w$-3<$B_w$-4; $C_w$-1<$C_w$-2<$C_w$-3; and $D_w$-1<$D_w$-2.

In some embodiments $A_t$<$B_t$<$C_t$<$D_t$<$E_t$, and/or $A_w$>$B_w$>$C_w$>$D_w$>$E_w$. In some embodiments, thicknesses of stages are constrained: if the thickness of a stage is too great, the mode doesn't adiabatically diverge vertically. If the thickness of the stage is too small it adds potentially unneeded steps to manufacturing. As the mode gets larger, thicker stages are tolerated. That is one reason why some embodiments might have $A_t$<$B_t$<$C_t$<$D_t$<$E_t$. Additionally, in some embodiments, a very narrow tip width is desired, and the tip width of a stage is limited by manufacturing capabilities.

A table of dimensions of the shoulder and ridge in FIGS. 4A-4F is shown below. The ranges below are meant to be exemplary for the mode expander in FIGS. 4A-4F, and not meant to limit the scope of the invention.

| Dimension | Example Range(s) (μm) | Example Values (μm) |
|---|---|---|
| $S_t$ | 0.2-10; 1-4 | 1, 1.5, 2 |
| $S_w$-1 | 0.1-10; 1-4 | 2, 3, 4 |
| $S_w$-2 | 0.1-10; 2-5 | 3.0, 3.5, 3.8 |
| $S_w$-3 | 0.1-10; 4-10 | 4, 5, 6 |
| $S_w$-4 | 0.1-12; 6-12 | 7, 8, 9 |
| $S_w$-5 | 0.1-12; 10-15 | 11, 13, 15 |
| $A_t$ | 0.2-10; 0.2-1.2 | 0.5, 0.6, 0.8, 1.0 |
| $A_w$-1 | 0.1-10; 0.4-1.2 | 0.6, 0.8, 1 |
| $A_w$-2 | 0.1-10; 1-4 | 2.5, 3, 3.5, 4 |
| $A_w$-3 | 0.1-10; 3-9 | 3.5, 4.0, 4.5 |
| $A_w$-4 | 0.1-11; 5-11 | 6, 7, 8 |
| $A_w$-5 | 0.1-12; 6-13 | 10, 11, 13 |
| $B_t$ | 0.2-10; 0.5-1.4 | 0.8, 1.2, 1.3, 1.4 |
| $B_w$-1 | 0.1-10; 0.4-0.8 | 0.5, 0.6, 0.7 |
| $B_w$-2 | 0.1-10; 2-6 | 3.0, 3.5, 4 |
| $B_w$-3 | 0.1-10; 2-8 | 5, 6, 7 |
| $B_w$-4 | 0.1-10; 6-13 | 9, 11, 12 |
| $C_t$ | 0.2-10; 1-4 | 1, 2, 3 |
| $C_w$-1 | 0.1-10; 0.6-1.5 | 0.8, 1.0, 1.2, 1.4 |
| $C_w$-2 | 0.1-10; 4-6 | 4.5, 5, 5.5 |
| $C_w$-3 | 0.1-12; 8-12 | 8, 10, 11 |
| $D_t$ | 0.2-10; 1-5 | 2, 3, 4 |
| $D_w$-1 | 0.1-10; 1-2 | 1, 1.5, 2 |
| $D_w$-2 | 0.1-11; 5-11 | 6, 7, 8.5 |
| $E_t$ | 0.2-10; 2-7 | 4, 5, 6 |
| $E_w$-1 | 0.1-10; 1.5-3 | 1.5, 2, 2.5, 3 |

Figure 5A:
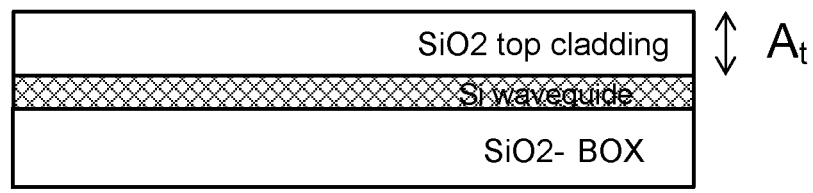
FIGS. 5A-5G depict an embodiment of a process for manufacturing a mode expander.

Referring next to FIGS. 5A-5G, an embodiment of a process for manufacturing a mode expander is shown. In FIG. 5A, a waveguide made of crystalline silicon is sandwiched between a substrate (labeled $SiO_2$—BOX) and a cladding layer. Although reference is made to this embodiment including crystalline silicon and/or polysilicon, it is contemplated that other semiconductors may be utilized, as discussed herein. The substrate and the cladding layer are made of $SiO_2$. The cladding layer is polished (e.g., using Chemical-mechanical planarization (CMP)) to a thickness of the first stage of the mode expander.

Figure 5B:
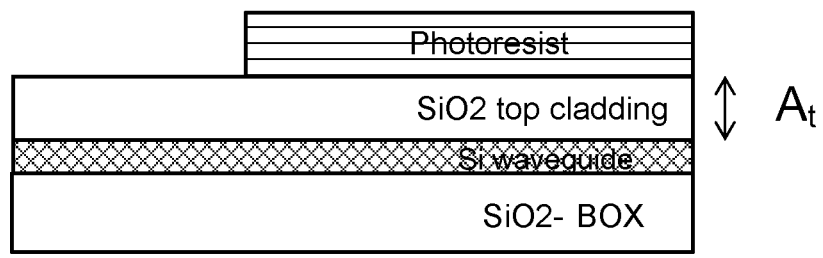

In FIG. 5B, a photoresist is paced in a pattern on top of the cladding layer of FIG. 5A. The pattern covers part of the cladding layer but leaves part of the cladding layer exposed. In some embodiments, common photolithography methods are used in placing the photoresist in the pattern on the cladding layer (e.g., preparing the cladding layer; applying the photoresist; aligning a mask; exposing photoresist to light through the mask; and removing portions of the photoresist that were exposed to the light through clear portions of the mask).

Figure 5C:
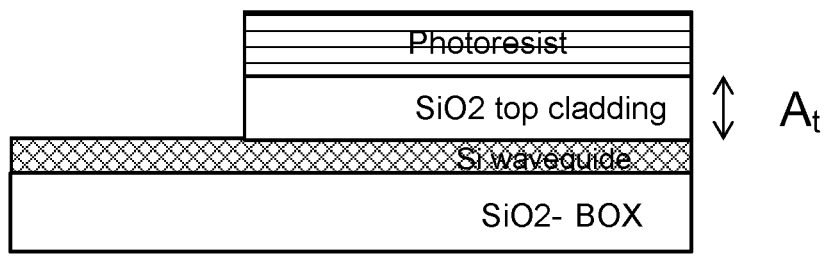

In FIG. 5C, a portion of the cladding layer that was not covered by the photoresist has been etched to form a recess in the cladding layer. The recess has an outline in the shape of the pattern. In some embodiments, the recess extends vertically to the waveguide and/or laterally to an edge of the waveguide, and/or the substrate. In some embodiments, a highly selective etch is used so that etching through $SiO_2$ happens more quickly than etching the silicon waveguide.

Figure 5D:
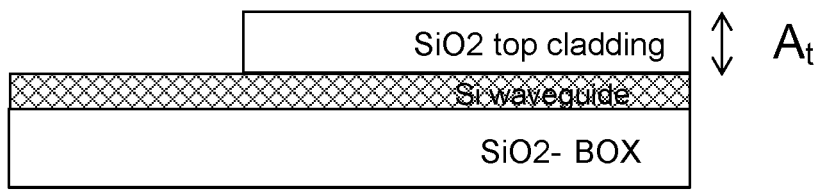

In FIG. 5D, the photoresist is removed.

Figure 5E:
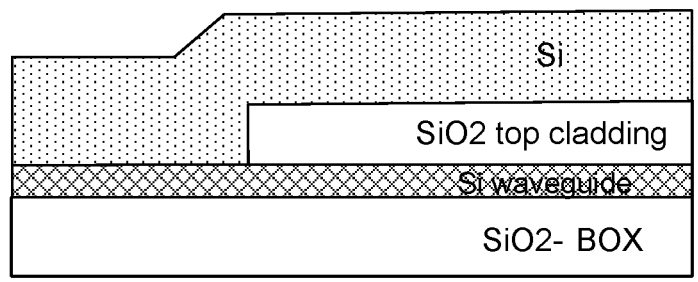

In FIG. 5E, the recess is filled with silicon, which may be amorphous silicon (a-Si). In some embodiments, the cladding layer is also covered with silicon.

Figure 5F:
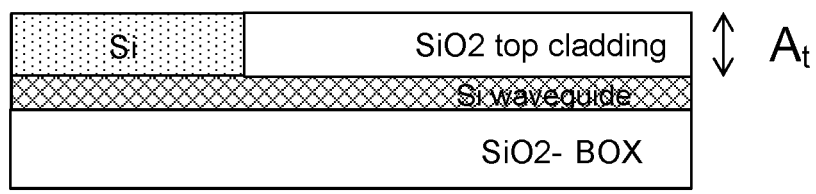

In FIG. 5F, amorphous silicon is optionally converted into polysilicon (e.g., by annealing). This conversion is optional depending on device requirements; certain embodiments may advantageously leave amorphous silicon in its initial state for low optical losses, while other embodiments may advantageously convert amorphous silicon to polysilicon for best index match with crystalline Si. Then, excess silicon (polysilicon or a-Si) is removed (e.g., using CMP) so that the silicon and the cladding layer are as thick as the first stage. In certain embodiments, a highly selective CMP process is used that polishes the silicon more aggressively than $SiO_2$ of the cladding.

Figure 5G:
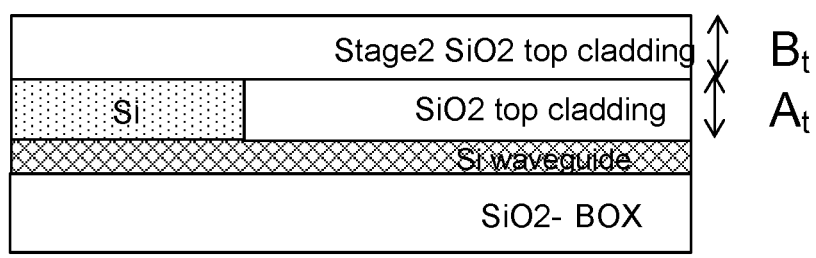

In FIG. 5G, a second cladding layer is deposited on top of the first cladding layer and polished to a thickness of a second stage. FIG. 5G represents a start in making a second stage of a mode expander that has a ridge with multiple stages. The process can then be repeated for fabricating a mode expander with multiple stages. In some embodiments, the number of stages made is a tradeoff between performance and manufacturability.

Thus, in the embodiments illustrated in FIGS. 5A-5G and others herein, widths and lateral position of mode expander stages are controlled by photolithography, and thicknesses are controlled by deposition, high-selectivity etching, and/or CMP. Thus, in these embodiments, this process provides a way to manufacture a mode expander fairly precisely with favorable manufacturing tolerances (e.g., as compared to simply etching a mode expander made entirely of crystalline silicon, or a monolithic block of other semiconductor material).

Figure 6:
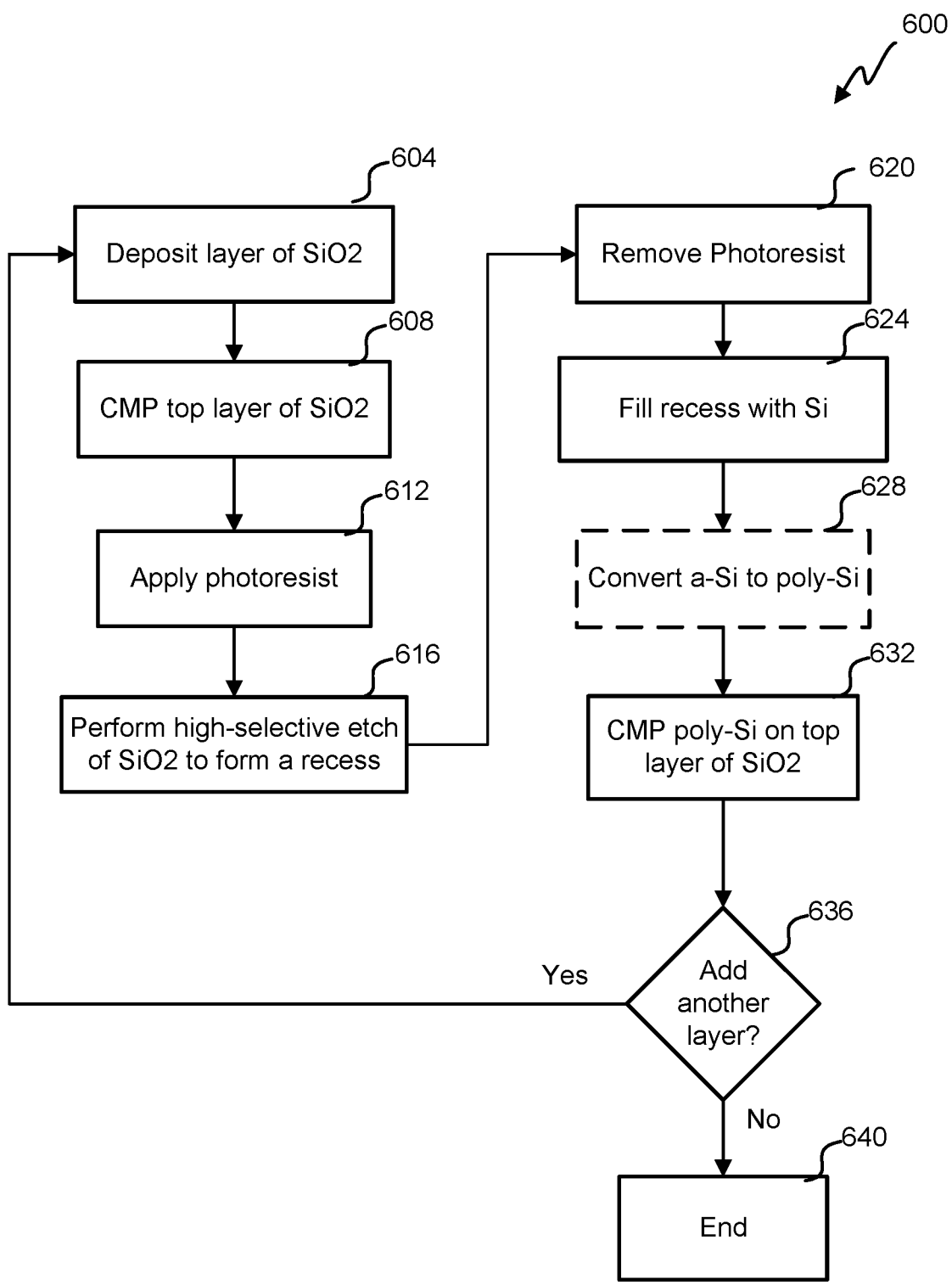
FIG. 6 depicts an embodiment of a flowchart of a process for manufacturing a mode expander.

Referring to FIG. 6, a flowchart of a method 600 for manufacturing a mode expander is shown. This embodiment is described as including $SiO_2$ as cladding and silicon as a waveguide, but it is contemplated that other materials can be used for cladding and waveguides respectively; one skilled in the art will readily recognize many variations, modifications and equivalents. In step 604 a top layer of $SiO_2$ is deposited (e.g., as cladding for a waveguide). The top layer of $SiO_2$ is polished to a predetermined height (e.g., using CMP). Polishing the top layer of $SiO_2$ creates a relatively flat surface. In step 612 a photoresist is placed on the relatively flat surface. In some embodiments, before the photoresist is placed on the relatively flat surface, a thin layer of silicon nitride ($Si_3N_4$) is placed on the relatively flat surface (e.g., the thin layer of silicon nitride being 50, 75, 100, 125, 150, or 200 nm thick). The thin layer of silicon nitride is used as a stop for CMP polishing instead of $SiO_2$, as discussed in step 632.

In step 624, the recess is filled with silicon. In some embodiments, the recess and the top layer of $SiO_2$ are blanketed with a-Si. In some embodiments, only a portion of the top layer of $SiO_2$ is blanketed with Si when filling in the recess. In an optional step 628, a-Si is converted to polysilicon (e.g., by heat); in embodiments, step 628 can be omitted, leaving deposited a-Si (or polysilicon) in its as-deposited state. Omitting step 628 may result in lower optical losses, as polysilicon can have higher optical loss than a-Si. In step 632, a highly selective CMP polish is used to remove silicon so that the silicon does not exceed the predetermined height (e.g., using the $SiO_2$ as a stop layer for the highly-selective CMP polish).

Figure 7:
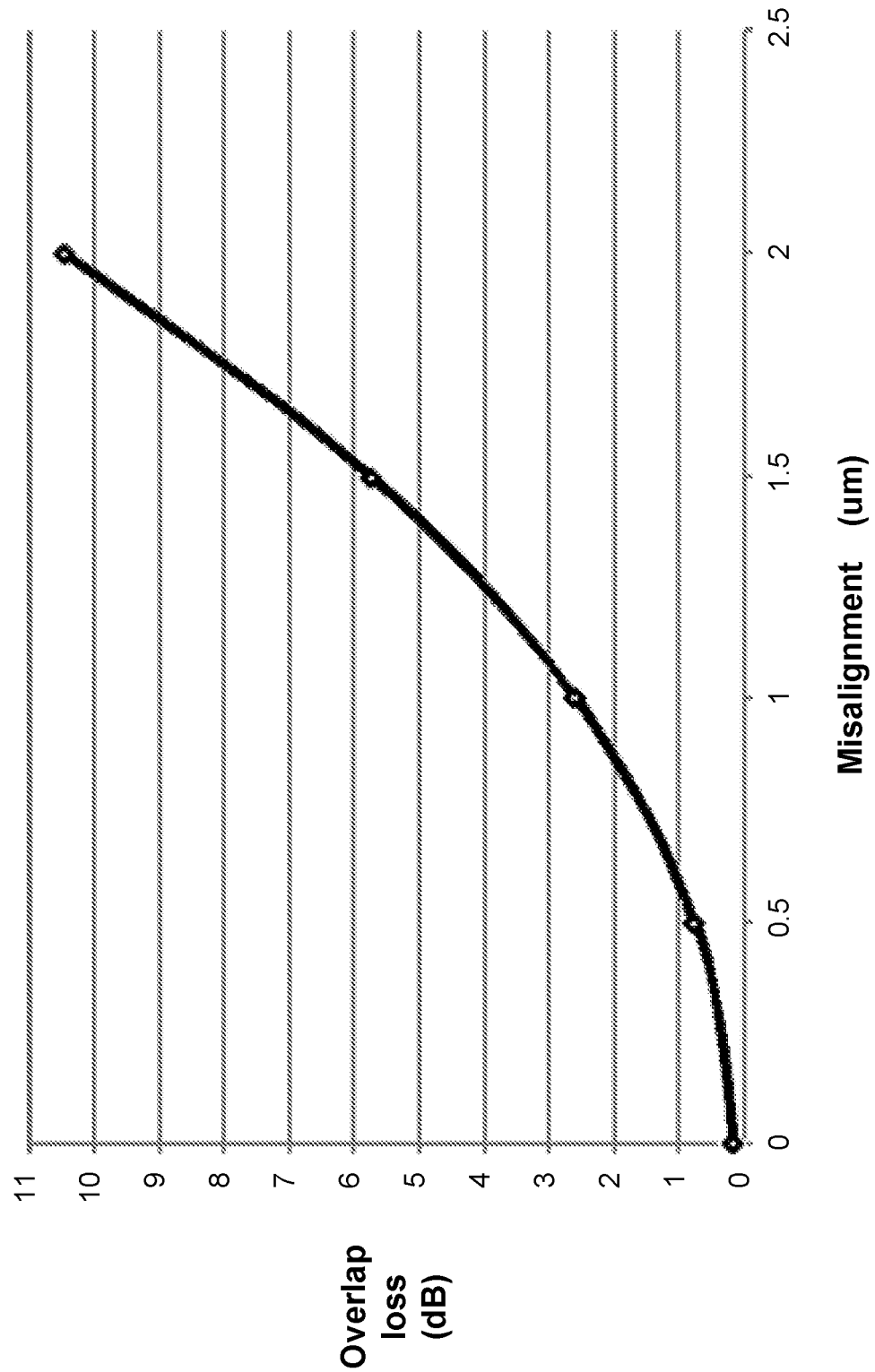
FIG. 7 depicts a simulation of loss as a function of misalignment of the mode expander in FIG. 2A and the optical fiber in 2B.

In some embodiments, a mode expander is designed to reduce coupling loss when end coupling a beam into an optical fiber (e.g., butt coupling). In FIG. 7, a graph shows simulated loss due to misalignment between the mode expander in FIG. 2A and the optical fiber in FIG. 2B. The horizontal axis shows misalignment measured in microns (misalignment measures an offset of the center of the mode expander in FIG. 2A to the center of the optical fiber in FIG. 2B). The vertical axis shows loss measured in decibels. The graph shows a loss less than 1 dB for a 0.5 μm misalignment; a loss between 2 and 3 dB for a 1 μm misalignment; a loss between 5 and 6 dB for a 1.5 μm misalignment; and a loss between 10 and 11 dB for a 2.0 μm misalignment.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention is presented for the purposes of illustration and description. It is not intended to be exhaustive or to limit the invention to the precise forms described, and many modifications and variations are possible in light of the teaching above. For example, though five stages were shown for a ridge in FIG. 4F, a greater or lesser number of stages could be used. Many of the dimensions are based on a laser wavelength of 1310 nm propagating through a mode expander. Different dimensions can be used for different wavelengths of light, and embodiments may scale in size according to wavelength of the light intended for use. Different dimensions can also be used when coupling to different off-chip devices such as different types of optical fibers with different mode sizes and numerical apertures. Further, all or part of a mode expander may be encapsulated in $SiO_2$, InP, and/or other cladding material. Additionally, though the examples given couple an optical mode of a silicon waveguide to an optical fiber, other features could be fabricated using methods similar to those disclosed in FIGS. 5 and 6, including waveguides of other materials. For example, a mode expander could be used to couple one silicon waveguide to a second silicon waveguide. In another example, a first waveguide at a first height is coupled to a second waveguide at a second height (poly-Si stages being used to move a mode vertically over a horizontal distance in addition to, or instead, of being used to expand or contract a size of the mode). Thus silicon waveguides can be made to guide a beam in three dimensions. Thus multiple waveguides can be layered, vertically, on one chip and combined with one another. In another example, a mode expander couples a silicon waveguide to discrete optics instead of an optical fiber. In addition to silicon, III-V and/or II-VI semiconductor materials, or ternary or quaternary alloys thereof, could be used. The illustrated embodiments are chosen and described in order to explain the principles of the invention and its practical applications to thereby enable others skilled in the art to utilize the invention in various embodiments and with various modifications as are suited to the particular use contemplated.

Figure 8A:
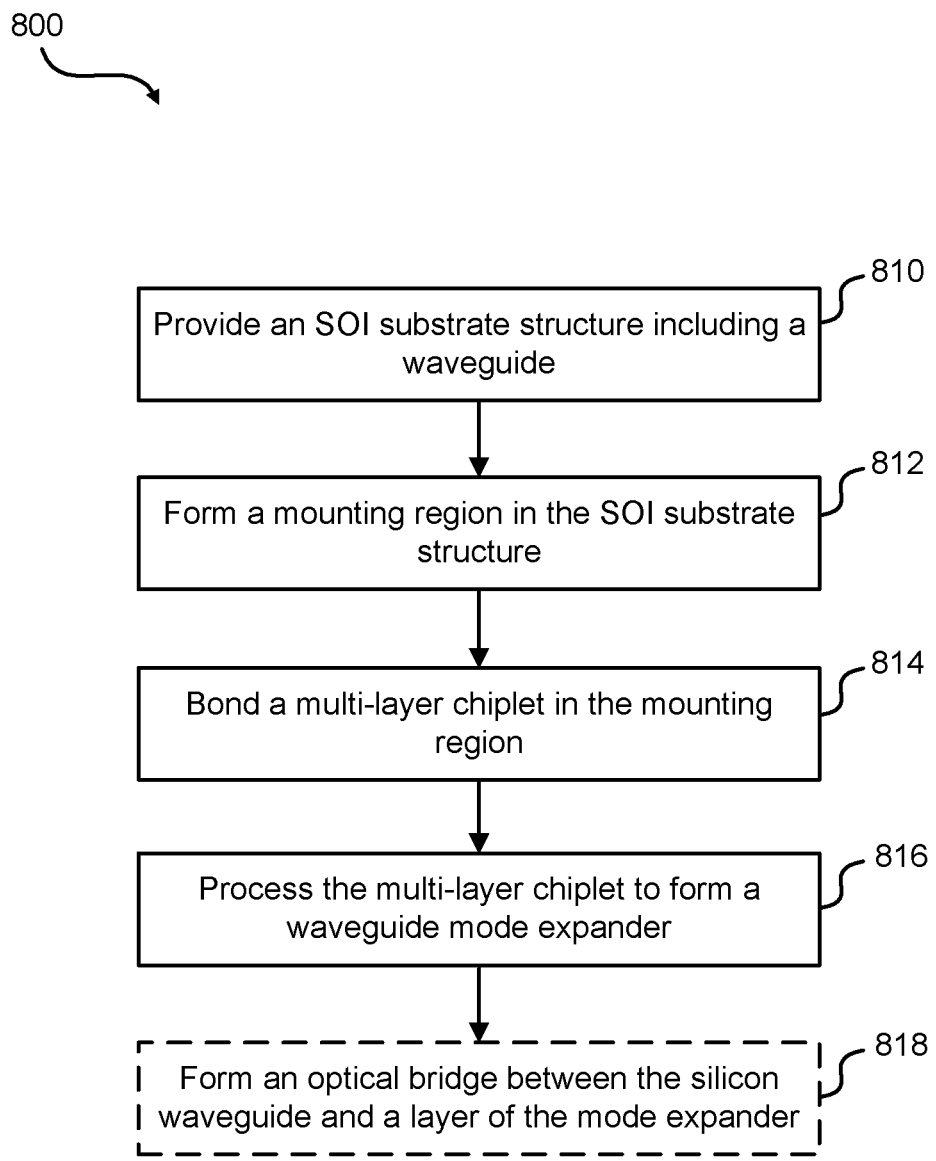
FIG. 8A is a simplified flowchart illustrating a method of fabricating an integrated mode expander, according to an embodiment.

FIG. 8A is a simplified flowchart illustrating a method 800 of fabricating an integrated mode expander according to an embodiment of the present invention. The method illustrated in FIG. 8A enables the fabrication of a chiplet-based mode expander that provides benefits not available using conventional techniques. The method includes providing an SOI substrate structure including a waveguide (810). The waveguide may be formed of silicon or other suitable semiconductor material. A mounting region is formed in the SOI substrate (812). The mounting region may optionally form a pedestal to set height of a chiplet to be bonded into the mounting region. A chiplet, having suitable dimensions for a desired mode expander and, optionally, having multiple layers with thicknesses that correspond to intended thicknesses of layers desired for successive mode expander stages, is bonded in the mounting region (814). The chiplet includes a set of high bandgap semiconductor layers. Herein, "high bandgap" means that a bandgap of the semiconductor layers exceeds the energy per photon of light intended for use therewith, so that the light does not attenuate due to interaction with the semiconductor (e.g., generation of an electron-hole pair through absorption of a photon). In certain embodiments, the bandgap exceeds a photon energy of the intended light by at least 100 meV. There is no upper limit to the semiconductor's bandgap in terms of usefulness, but 100 eV might be considered an upper bound of bandgap insofar as no materials are currently believed to have a bandgap that high. In certain embodiments, step 814 vertically aligns one of the high bandgap layers with the waveguide.

The method continues by processing the chiplet to form a mode expander (816). Photolithography is typically used to define regions of the chiplet to be etched. Lateral control provided by the photolithography provides a mode expander shape that is capable of adiabatically expanding a mode propagating therethrough, and provides lateral alignment to the existing waveguide. Certain embodiments of step 816 are discussed below and in connection with FIG. 8B. In these and certain other embodiments, an optional step 818, also discussed below and in connection with FIGS. 14 and 15, forms an optical bridge between the waveguide and the mode expander thus formed.

In certain embodiments, etch stop layers are interposed between the high bandgap semiconductor layers. The etch stop layers etch at significantly different rates than the high bandgap layers, so that they can help control final thickness of etched features (e.g., in step 816 of method 800), but in certain embodiments are thin enough that their presence is optically insignificant. Thickness of the etch stop layers is determined as a thickness that, in combination with an etch rate selectivity of the high bandgap layers, makes the etch stop layer block etching into underlying layers when an overlying high bandgap layer is being etched back. The etch stop layer typically only has to resist the etch of the overlying high bandgap layer for a brief period during the final stages of an etch, that is, while the etch removes residual portions of the overlying high bandgap layer that can occur due to local topology, nominal thickness variations and/or cross-wafer thickness variations. For example, in embodiments etch stop layers are between about 10 nm and 100 nm in thickness. If refractive index of an etch stop layer is similar enough to that of adjacent high bandgap layers, or an overlying high bandgap layer is very thick (e.g., with a large associated uniformity tolerance) the etch stop layer may be up to about 200 nm in thickness. In other embodiments, alternating layers of high bandgap material with identical refractive index but differing properties are used, such that the alternating layers may be etched one at a time, each etch limited by the layer below, but the final product behaves optically as a single material. Whether etch stop layers or alternating layers with identical refractive index are used, the high bandgap layers advantageously have thicknesses compatible with formation of a mode expander structure that adiabatically expands a mode propagating through the mode expander. Usefulness of etch stop layers is not confined to embodiments that use multi-layer chiplets; mode expanders such as shown in FIGS. 1A-1C, 2A, 2C, 3A-3F and 4A-4F can also advantageously include etch stops to facilitate vertical thickness control of stages.

Figure 8B:
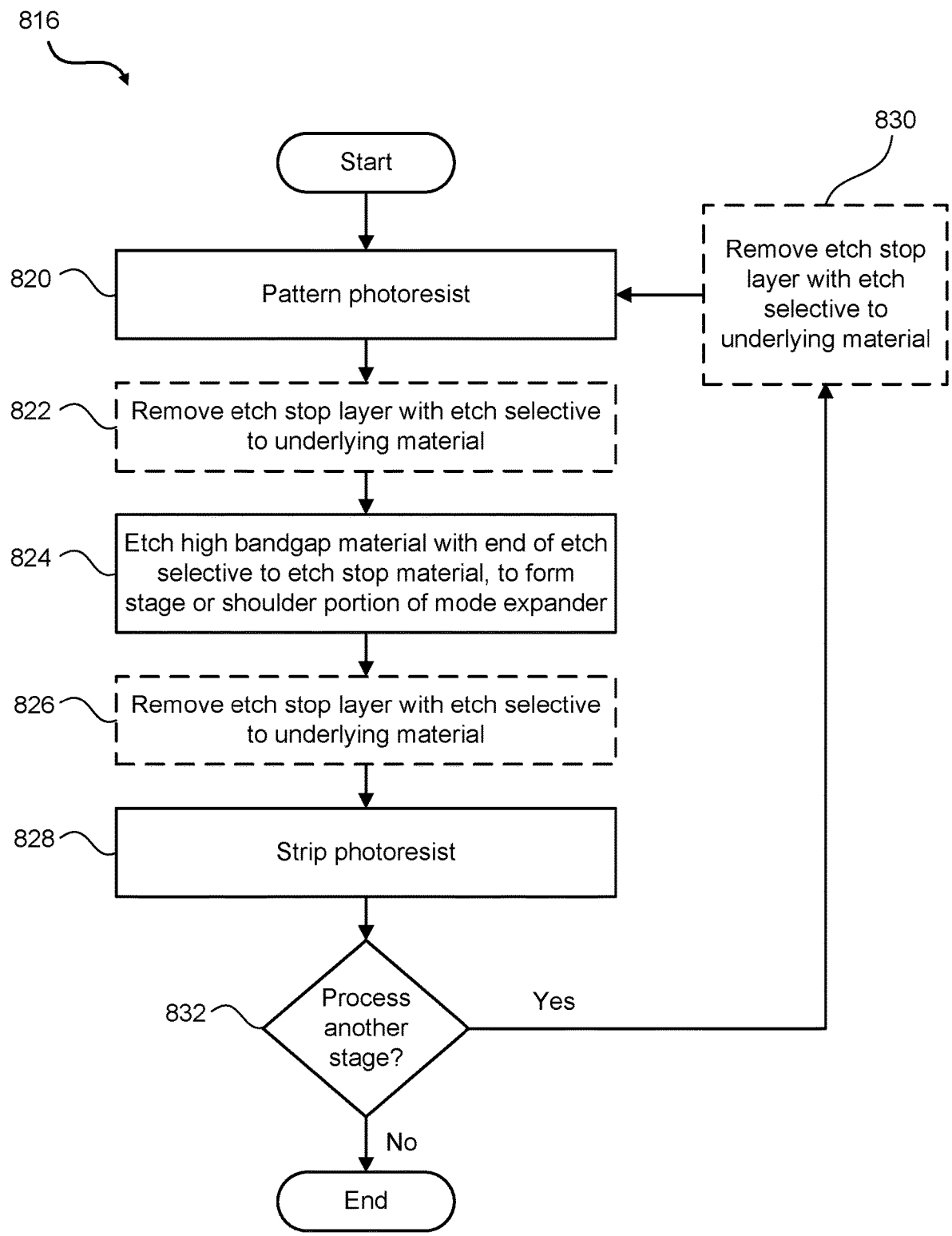
FIG. 8B is a simplified flowchart illustrating substeps of one step of the method illustrated in FIG. 8A, that processes a multi-layer chiplet including layers of high bandgap material interspersed with etch stop layers.

FIG. 8B is a simplified flowchart illustrating an embodiment of step 816 of method 800 that processes a multi-layer chiplet including layers of high bandgap material interspersed with etch stop layers. As successive layers of the high bandgap material are etched, there are several options for removing the intervening etch stop layers, thus occurrences of these steps are characterized as optional. Included in step 816 are process steps 820 through 830 that collectively process a single stage or shoulder portion of a mode expander from a multi-layer chiplet, and a decision 832 that determines whether the sequence of steps 820 through 830 should be repeated to process a further stage.

Figure 11:
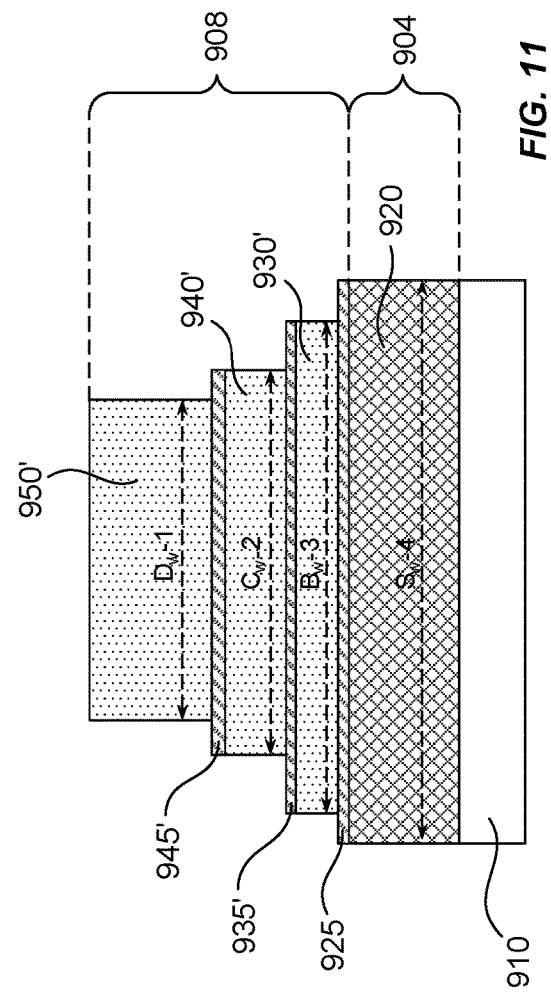
FIG. 11 schematically illustrates a cross-section of a mode expander where indicated by another plane shown in FIG. 1, according to an embodiment.

Step 820 patterns a photoresist mask to define shape and position of one stage or shoulder portion of a mode expander. For example, step 820 may pattern a photoresist mask to define a shape and position of any of layers 920, 930, 940 or 950 (discussed below, and shown in FIG. 9) to form modified layers 920', 930', 940' or 950' as shown in FIG. 11, for use as stages or shoulder portions of a mode expander. An optional step 822 removes an etch stop layer with an etch that is selective to an underlying material. For example, if the stage being defined is an intermediate stage of the mode expander, the etch used in step 822 would remove the etch stop layer from an overlying layer, using an etch that is selective to a layer below the etch stop layer. Step 824 etches high bandgap material that is not protected by the photoresist mask from step 820, to form the stage being defined. At least the end of the etch used in step 824 is selective to an underlying etch stop layer, so that etching does not proceed into an underlying stage. That is, the etch in step 824 might begin as a relatively nonselective etch while the etch proceeds through most of the high bandgap material, but would be changed to a selective etch before etching to the bottom of the high bandgap material. The selectivity of the etch used at the end of step 824 would be chosen to allow enough overetch of the layer being processed to clear residual high bandgap material due to topology or imperfect uniformity, while ensuring that the etch stop layer would not be etched through. An optional step 826 removes the etch stop layer underlying the high bandgap material etched in step 824, with an etch selective to an underlying material. Similar to the situation noted above, step 826 is optional in that the etch stop layer could be removed later, for example after the photoresist mask is removed in step 828, or if the stage being processed is the final stage to be processed, the etch stop layer may not be removed at all.

Step 828 removes the photoresist mask formed in step 820. At this point a decision 832 determines whether the sequence of steps 820 through 828 should be repeated to process a further stage. If the mode expander is complete, processing of the mode expander simply ends. If there is a further stage or shoulder portion to be processed, an optional step 830 removes the etch stop layer underlying the high bandgap material etched in step 824, with an etch selective to an underlying material. Similar to the situations noted above, step 830 is optional in that the etch stop layer may have been removed in an earlier step 826, or could be removed later, for example after a new photoresist mask is removed in step 820.

It should be appreciated that the specific steps illustrated in FIGS. 8A and 8B provide a particular method of fabricating an integrated mode expander according to an embodiment of the present invention. Other sequences of steps may also be performed according to alternative embodiments. For example, alternative embodiments of the present invention may perform the steps outlined above in a different order. Moreover, the individual steps illustrated in FIGS. 8A and 8B may include multiple sub-steps that may be performed in various sequences as appropriate to the individual step. Furthermore, additional steps such as cleaning may be added depending on the particular applications. One of ordinary skill in the art would recognize many variations, modifications, and alternatives.

Figure 9:
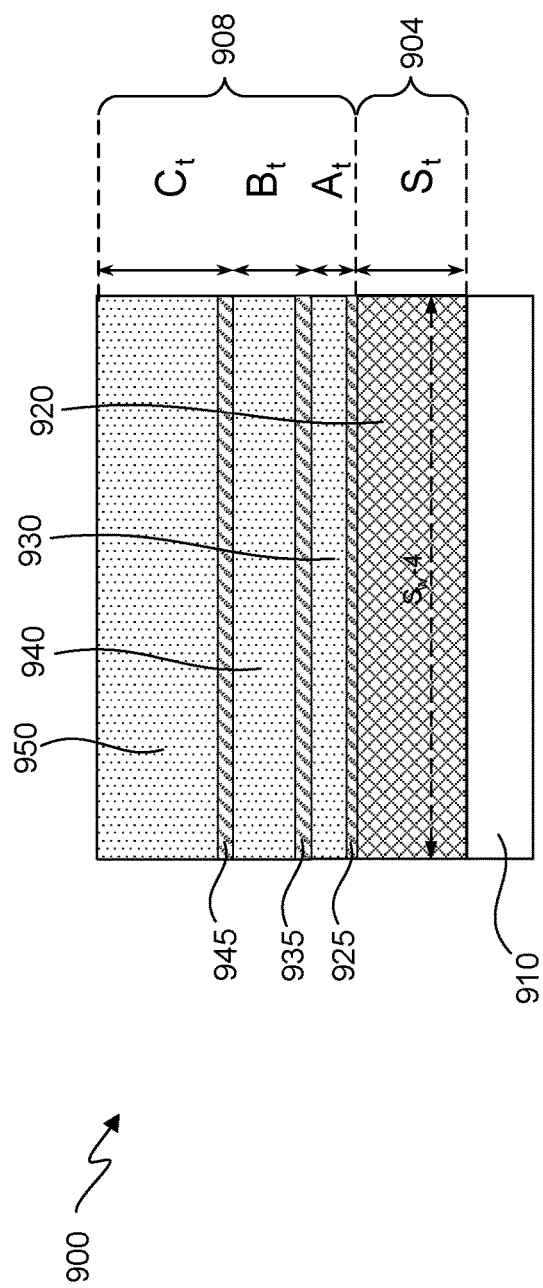
FIG. 9 is a schematic cross-sectional illustration of an engineered chiplet from which the mode expander of FIG. 1 can be fabricated, according to an embodiment.
Figure 10:
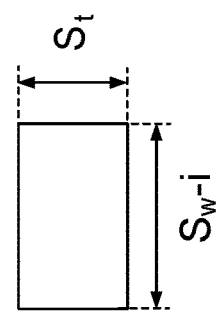
FIG. 10 schematically illustrates a cross-section of a mode expander where indicated by one plane shown in FIG. 1, according to an embodiment.
Figure 17:
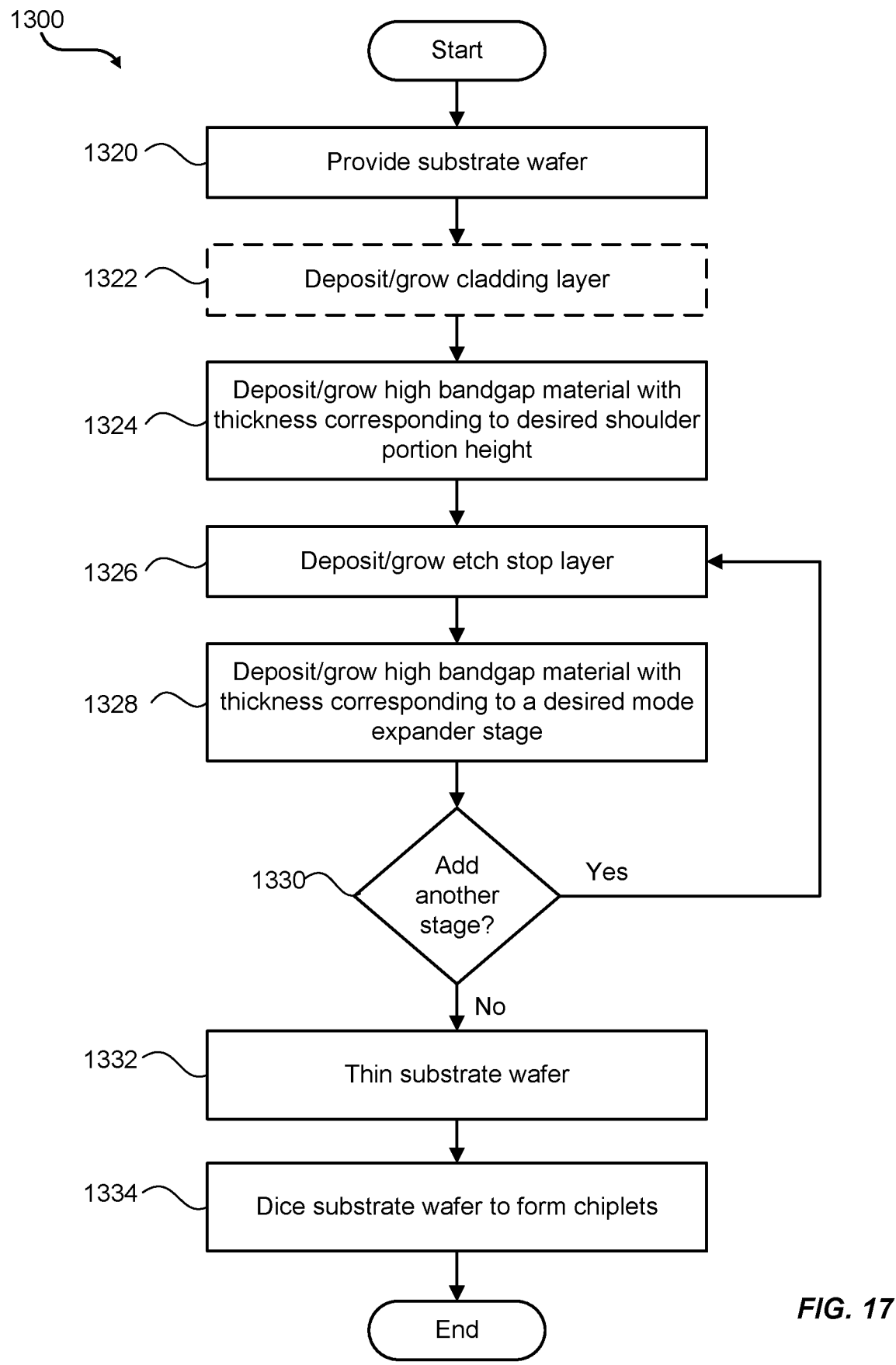
FIG. 17 is a simplified flowchart illustrating a method that generates a multi-layer chiplet including layers of high bandgap material interspersed with thin etch stop layers, according to an embodiment.

FIGS. 9-11 are schematic cross-sectional illustrations of portions of a mode expander at various stages of processing according to embodiments herein. These embodiments of mode expander 100 utilize chiplets that are bonded onto the SOI wafer and already include a bottom cladding layer (e.g., an $SiO_2$ or InP layer) before bonding. FIG. 9 illustrates an engineered chiplet 900 from which a mode expander can be fabricated. Chiplet 900 may be manufactured, for example, using the process illustrated in FIG. 17. Chiplet 900 shown in FIG. 9 includes layer 910 as a bottom cladding layer. As illustrated in FIG. 17, layer 910 may be deposited on a surface of a wafer before the wafer is singulated (e.g., diced) into chiplets 900, which, in turn, would precede bonding chiplets 900 into mounting regions, also referred to as recesses, of the SOI wafer or SOI substrate, as discussed above. Above cladding layer 910, chiplet 900 includes a first layer 920 (sometimes called a "shoulder layer" herein) and successively overlying layers 930, 940 and 950. Exemplary layer thickness designations $S_t$, $A_t$, $B_t$, and $C_t$ of shoulder layer 920 and overlying layers 930, 940 and 950 are also shown; the notation used is consistent with that shown in FIGS. 4A-4D and referred to above. Interspersed between first layer 920 and overlying layers 930, 940 and 950 are etch stop layers 925, 935 and 945.

Figure 12:
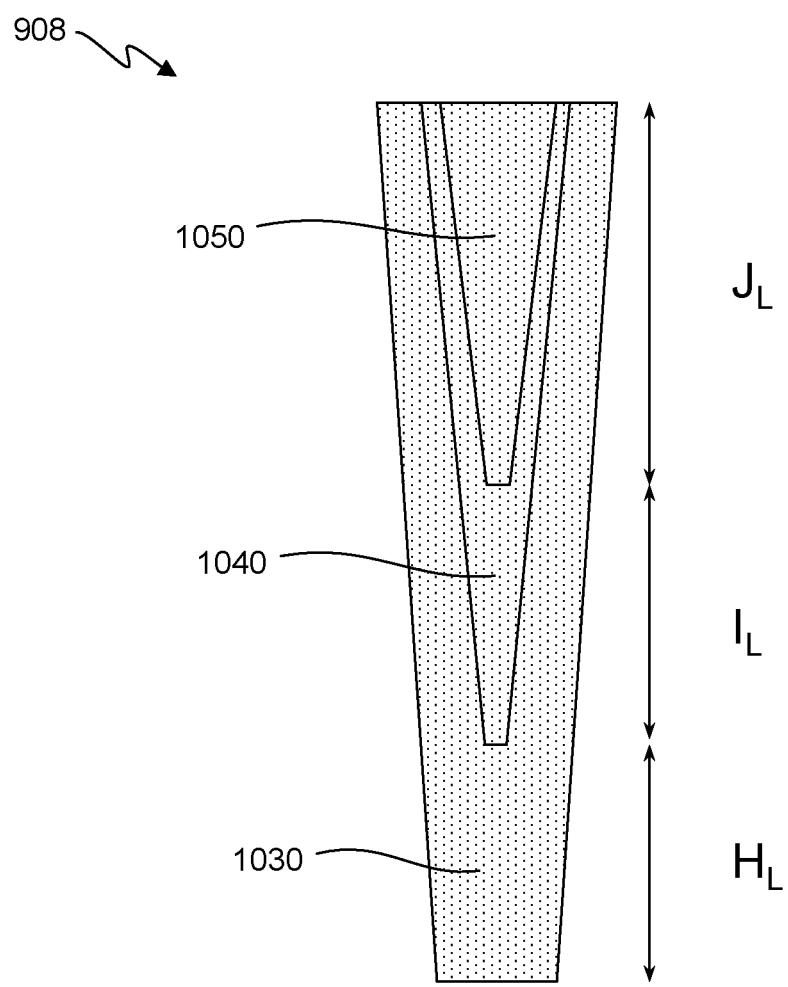
FIG. 12 schematically illustrates a top view of a finished mode expander ridge portion, indicating exemplary feature sizes of a waveguide ridge that provides adiabatic expansion of modes propagating therethrough, according to an embodiment.

Shoulder layer 920 of chiplet 900 is used to form a shoulder portion 904 (e.g., an example of shoulder 104 of mode expander 100) while overlying layers 930, 940 and 950 form ridge portion 908 (e.g., an example of ridge 108 of mode expander 100). Etch stop layers 925, 935, 945 are thin enough that their presence does not materially affect the optical performance of the finished mode expander. Chiplet 900, shown in an end view in FIG. 9, initially has a width of $S_w$-4, using the notation described above. The end view illustrated in FIG. 9 would be orthogonal to a direction of light propagation in a finished mode expander, that is, light would travel in and out of the cross-sectional plane of FIG. 9. (A side view of chiplet 900 would show the same layers, but would be much wider; see for example FIG. 12 showing tapered portions fabricated from the layers shown in FIG. 9.) The widths of the upper various layers of chiplet 900 will generally be reduced in subsequent processing, as described below. Widths of the bottommost layers 910, 920 and etch stop layer 925 may or may not be reduced in processing, that is, chiplet 900 including layers 910, 920 and 925 may be provided with width $S_w$-4 equivalent to the final width desired in the finished mode expander.

A variety of material systems can be used to form chiplet 900. In certain embodiments, layers 920, 930, 940 and 950 are Si and etch stop layers 925, 935 and 945 are $SiO_2$, $Si_3N_4$ or intermediate compounds $SiO_xN_y$. In other embodiments, layers 920, 930, 940 and 950 are III-V semiconductors such as InP or GaAs, or alloys thereof, and etch stop layers 925, 935 and 945 might be other III-V semiconductors or alloys thereof. For example, in alloys of InP, some or all of In might be replaced by Al and/or Ga, and/or some or all of P might be replaced by As and/or N. In alloys of GaAs, some or all of Ga might be replaced by Al and/or In; and/or some or all of As might be replaced by N or P. In yet other embodiments, layers 920, 930, 940 and 950 are II-VI semiconductors, or alloys thereof, and etch stop layers 925, 935 and 945 might be other II-VI semiconductors or alloys thereof. Advantageously, the specific materials chosen would enable adjacent layers to be grown epitaxially while maintaining lattice continuity, and provide materials of different compositions to enable selective etching of layers 920, 930, 940 and/or 950 to form appropriate tapered portions, while the etches used would slow down or stop etching once they reach etch stop layers 925, 935 and 945. One of ordinary skill in the art would recognize many variations, modifications, and alternatives.

Referring back momentarily to FIG. 1A, mode expander 100 is shown with an input cross-sectional plane 112 indicated. FIG. 10 illustrates a cross-section of mode expander 100 where indicated by plane 112. At plane 112, the cross-section of mode expander 100 is a simple rectangle that features exemplary dimensions of $S_w$-i=2 μm wide and $S_t$=1.5 μm high. As shown below, the 1.5 μm height may be closely matched to a height of a SiP/SOI waveguide that it faces in the finished device; thus it should be understood that the 2 μm width and 1.5 μm height are exemplary and chosen for illustrative purposes only. The 2 μm width $S_w$-i is formed by etching material from engineered chiplet 900.

Again referring back momentarily to FIG. 1A, mode expander 100 is shown with an output cross-sectional plane 116 indicated. FIG. 11 illustrates a cross-section of mode expander 100 where indicated by plane 116. At plane 116, the cross-section of mode expander 100 includes the same layers as shown in FIG. 9. Layers 910, 920 and 925 have the same width $S_w$-4 as shown in FIG. 9; the remaining layers are labeled as 930', 935', 940', 945' and 950' due to their reduced widths at (output) sectional plane 116.

The multi-layer construction illustrated in FIG. 11 confers certain advantages, but is not the only way that an engineered chiplet may be generated and/or utilized to form a mode expander. For example, a monolithic piece of Si could be utilized, and subsequent processing would generate both the lateral and vertical profiles discussed herein. When multiple layers are utilized, the overlying layers begin with thinner layers immediately above the shoulder layer (e.g., layer 920 as shown in FIGS. 9 and 11) and end with thicker layers (e.g., up to and including layer 950/950'), to promote adiabatic expansion, in the vertical direction, of modes propagating through the mode expander, as discussed above. Exemplary widths are also shown; the notation shown at cross-section represented in FIG. 11 is consistent with that shown in FIGS. 4A-4D and referred to above. Also shown are etch stop layers 925, 935/935', 945/945' that assist in manufacturing by providing a defined stopping thickness for their respective overlying and underlying layers. The etch stop layers are for example thick enough to block certain etches effectively but thin enough that their presence does not materially affect the optical performance of the finished mode expander. In certain embodiments, etch stop layers 925, 935/935', 945/945' are at least 10 nm thick and up to 200 nm thick, although best optical performance may be obtained when the etch stop layers are 100 nm thick or thinner. Upon reading and understanding the present disclosure, one of ordinary skill in the art would be able to determine appropriate thicknesses for etch stops for a particular application, and would recognize many variations, modifications, and alternatives.

FIG. 12 illustrates a top view of finished mode expander ridge portion 908, indicating exemplary feature sizes of a waveguide ridge that provides adiabatic expansion of modes propagating therethrough. Ridge portion 908 includes tapered portions 1030, 1040 and 1050 that are formed from layers 930, 940 and 950 respectively, as discussed above. Although three tapered portions are shown for consistency with the exemplary embodiments illustrated in FIGS. 9-11, the number and feature sizes of tapered portions may differ in embodiments, and are typically derived by simulating light propagation through specific systems of materials and geometries. Exemplary tapered feature lengths are also given using the notation shown in FIGS. 3A-3C, 4A-4D and referred to above. It will be appreciated upon reading and comprehending the present disclosure that the heights of the layers, the tapered feature geometries and alignment of the mode expander to a waveguide will all be efficiently, accurately and independently controllable. For example, the thicknesses will be controlled by depositions that form the chiplet, the use of etch stop layers will maintain this control through etching operations, and tapered feature geometries and alignment will be set with high precision that is easily achievable through photolithography.

FIG. 13 schematically illustrates, in a side view, engineered chiplet 900 coupled with an SOI substrate 1100 having a waveguide layer 1110 fabricated thereon, before the photolithography and etching steps used to form a mode expander from chiplet 900. In FIG. 13, a metal to semiconductor bond 1120 is shown coupling chiplet 900 with SOI substrate 1100, but other forms of bonding are possible. Shoulder layer 920 of chiplet 900 aligns with waveguide layer 1110 so that light can propagate from waveguide layer 1110 into shoulder layer 920, that is, from left to right in the orientation of FIG. 13. In chiplet 900, layers 930, 940 and 950, and optional etch stop layers 925, 935, 945 discussed above in connection with FIGS. 9-11 are also shown. On SOI substrate 1100, cladding layers 1130 and 1140 are also shown. FIG. 13 is not drawn to scale, in particular thicknesses of the etch stop layers 925, 935, 945 are exaggerated, and width of chiplet 900 in the direction of light propagation is compressed, for illustrative clarity.

It may be advantageous from a manufacturing perspective to attach chiplets for further processing into mode expanders, instead of manufacturing the mode expander separately and placing it where needed, or manufacturing it entirely in situ. Manufacturing the mode expander separately, and integrating it with a waveguide when the mode expander is complete, may require a difficult physical alignment of the mode expander to a waveguide during placement of the mode expander, which must then be repeated for each instance of a mode expander coupling to a waveguide. Instead, certain embodiments herein place a plurality of engineered chiplets first, with looser alignment tolerances, on a substrate having multiple receiving locations for the chiplets, and utilize photolithography to define aligned features for etching each of the chiplets into a finished mode expander. In situ manufacturing may require deposition of many layers on product substrates, which layers are then largely etched away to leave the mode expander structure in a fraction of the area of the substrates. Use of engineered chiplets provides a significant material and/or processing savings related to the layers required to form the mode expanders, due to the fact that the mode expander occupies only a small fraction of area of the completed assembly. For example, a substrate that couples a hundred waveguides to mode expanders may have to undergo the sequence of deposition and etching steps to provide high bandgap semiconductor material and etch stops for only the hundred devices. However, many thousands of engineered chiplets might be harvested from a single substrate (of roughly comparable size to the waveguide substrate) that is prepared with the high bandgap semiconductor material and etch stop layers, after which the chiplets can be mated individually with the substrates that include the waveguides.

Still furthermore, other aspects of manufacturability are enhanced by separate fabrication of engineering chiplets, followed by their integration with SiP/SOI substrates. For example, thickness control of the engineered chiplet layers is critical to performance of the final product, and fabricating the engineered chiplets before they are integrated with waveguides facilitates significant improvements to thickness control as compared to deposition of the same layers within a recess of a waveguide substrate. In another example, planarization steps are often utilized to provide a surface that is uniform in height, which may not be possible when partially or completely finished mode expanders are present on the substrate (the mode expander surface is often higher than other surfaces, and should not be removed by a planarization process).

FIG. 14 schematically illustrates, in a side view, a mode expander 1200 fully processed and integrated with waveguide layer 1110 on SOI substrate 1100. High bandgap layers 920, 930, 940 and 950 as shown in FIGS. 9-11 and 13 are masked using photolithography, and selectively etched back to form tapered portions 1030, 1040 and 1050, which with shoulder portion 1020 formed from shoulder layer 920, form mode expander 1200. Optional etch stop layers, when present, assist in defining thicknesses of the finished features but are thin enough that their presence does not materially affect the optical performance of mode expander 1200, as discussed above. Additionally, to reduce optical losses between the c-Si waveguide and the mode expander, an optical bridge may be fashioned by filling a lower part of the recess that receives the chiplet with $SiO_2$ 1150, and providing an index matching material 1160 between waveguide layer 1110 and shoulder portion 1020. In embodiments, the index matching material may be amorphous silicon (a-Si). The finished structure is typically overcoated with $SiO_2$ 1140' that is optionally planarized, as illustrated.

Figure 15:
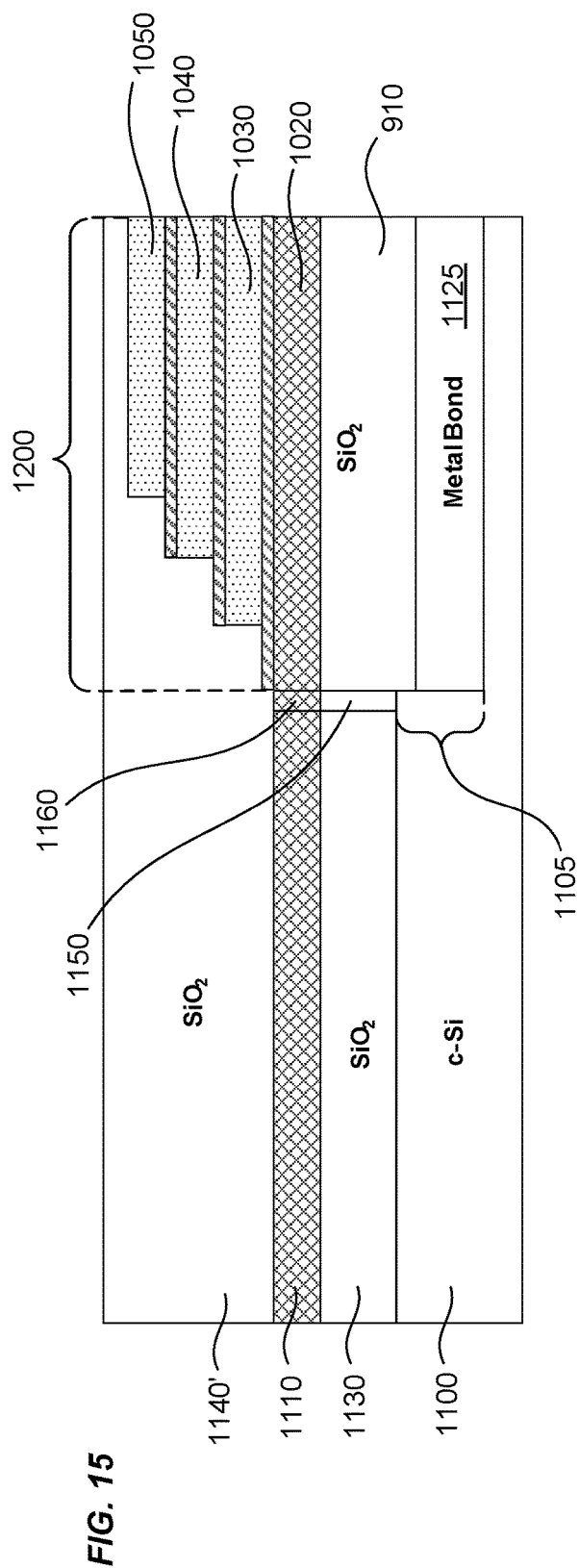
FIG. 15 schematically illustrates one strategy for integrating a mode expander as described above with an SiP/SOI structure, according to an embodiment.
Figure 16:
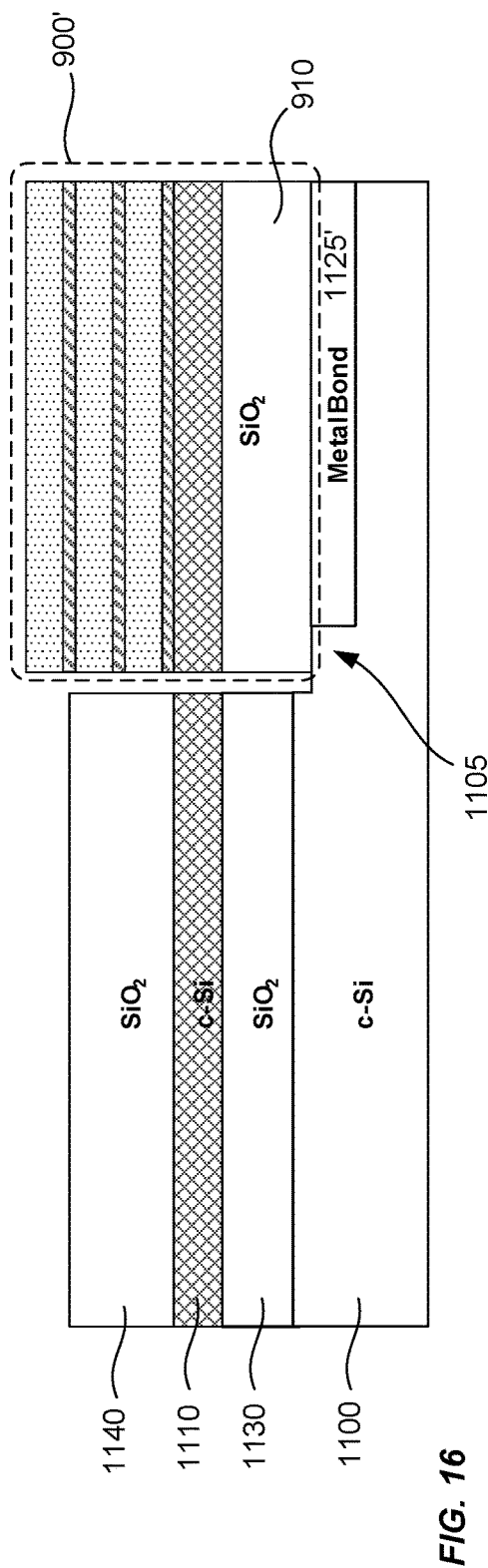
FIG. 16 schematically illustrates another strategy for integrating a mode expander as described above with an SiP/SOI structure, according to an embodiment.

FIGS. 15 and 16 illustrate different strategies for integrating a mode expander as described above with an SiP/SOI structure. In the structure illustrated in FIG. 15, a recess 1105 etched out of the SiP/SOI structure extends into substrate 1100, which is noted as formed of c-Si, although other embodiments are possible. Recess 1105 is etched to a depth that is based on known or estimated heights of cladding layer 910 and metal bond 1125, and thickness of lower cladding 1130, so that shoulder portion 1020 aligns in height with waveguide layer 1110.

In the structure shown in FIG. 16, a pedestal 1170 facilitates accurate height registration of a chiplet 900' that is bonded with substrate 1100 by a metal bond 1125'. Pedestal 1170 is an unetched portion of substrate 1100, the height of which can be accurately set by etching overlying layers 1140, 1110 and 1130, with the etch rate differential between Si and $SiO_2$ acting as an etch stop. Pedestal 1170 supports a lower surface of cladding layer 910 of chiplet 900', with metal bond 1125' extending to a lower surface of substrate 1100. Thus, the embodiment illustrated in FIG. 16 provides accurate positioning of metal bond 1125' and cladding layer 910 under the eventually-formed mode expander by utilizing pedestal 1170 to set the height of the various layers of chiplet 900'. Although FIG. 15 shows a finished mode expander 1200 with a planarized structure while FIG. 16 shows a partially finished assembly with chiplet 900' in place, these features are exemplary only. Upon reading and comprehending the present disclosure, it will be clear that the recess structures illustrated in both FIGS. 15 and 16 are applicable to both partially processed structures (e.g., like FIG. 16) and finished, planarized structures (e.g., like FIG. 15).

FIG. 17 is a simplified flowchart illustrating a method 1300 that generates a multi-layer chiplet including layers of high bandgap material interspersed with thin etch stop layers (e.g., chiplet 900, FIGS. 9 and 13, or chiplet 900', FIG. 16). With the variations described below, method 1300 may be used to generate chiplets that are either silicon based or compound semiconductor based (e.g., being formed of III-V or II-VI materials). Silicon based chiplets will typically incorporate amorphous or polycrystalline silicon at the mode expander shoulder portion and stage deposition/growth steps 1324, 1328 as described below, and will incorporate $SiO_2$, $Si_3N_4$ or $SiO_xN_y$ at etch stop deposition/growth step 1326. Compound semiconductor chiplets can use a wide variety of III-V or II-VI material choices that can be chosen based on desired bandgap, refractive index and etching properties as discussed above.

A first step 1320 of method 1300 provides a substrate wafer, which may be a crystalline wafer for epitaxial growth, or a suitable substrate for deposition of noncrystalline materials, as discussed below. The substrate wafer may have a cladding layer grown or deposited thereon. An optional step 1322 deposits (e.g., for silicon based chiplets) or epitaxially grows (e.g., for compound semiconductor chiplets) a cladding layer on the substrate. Typical choices for the cladding layer are $SiO_2$ for silicon based chiplets and InP for compound semiconductor chiplets. Step 1322 may be omitted when the substrate wafer provided in step 1320 already includes a suitable cladding layer. Step 1324 deposits or grows a high bandgap material having a thickness corresponding to a desired shoulder portion height of the mode expander to be fabricated. Step 1326 deposits or grows an etch stop layer that will protect the underlying layer from etching during further processing in which an overlying layer is etched. Step 1328 deposits or grows a high bandgap material having a thickness corresponding to a desired mode expander stage. Step 1330 is represented as a decision about whether to repeat steps 1326 and 1328 to deposit or grow a further etch stop layer and high bandgap material layer for a further mode expander stage. In practice it is likely that such "decision" will be moot in that instructions for repeating steps 1326 and 1328 can be part of a recipe executed by a deposition or epitaxial growth system to sequentially deposit or grow layers of the required number, type and thickness. After the required layers are deposited or grown, the substrate wafer with its deposited/grown layers is thinned to its ultimate desired thickness in step 1332, and diced in step 1334 into chiplets.

One of ordinary skill in the art would recognize many variations, modifications, and alternatives to the exact type, number and order of steps in FIG. 17, depending on the intended use of the chiplets produced thereby. A few non-limiting examples are now discussed. In one example, a separation layer may be deposited or grown before the cladding layer is deposited or grown. Such layer can be used to make the thinning operation less critical, in that the thinning operation can target a final thickness that will be within the separation layer, and the rest of the separation layer can be removed with an etchant that will not attack the cladding layer. In another example, the substrate may be considered to be at the top of chiplet 900 as shown in FIGS. 9 and 13, that is, the top layers illustrated in chiplet 900 may be deposited or grown first, and the lower layers grown later, with the cladding layer grown or deposited after the layer corresponding to the shoulder portion. In this example, too, a separation layer can be deposited or grown and used as described above. Furthermore, when the cladding layer is grown or deposited after the layer corresponding to the shoulder portion, a metal layer can be deposited on top of the cladding layer to facilitate the metal-to-semiconductor bonding shown in FIGS. 14-16.

Figure 18:
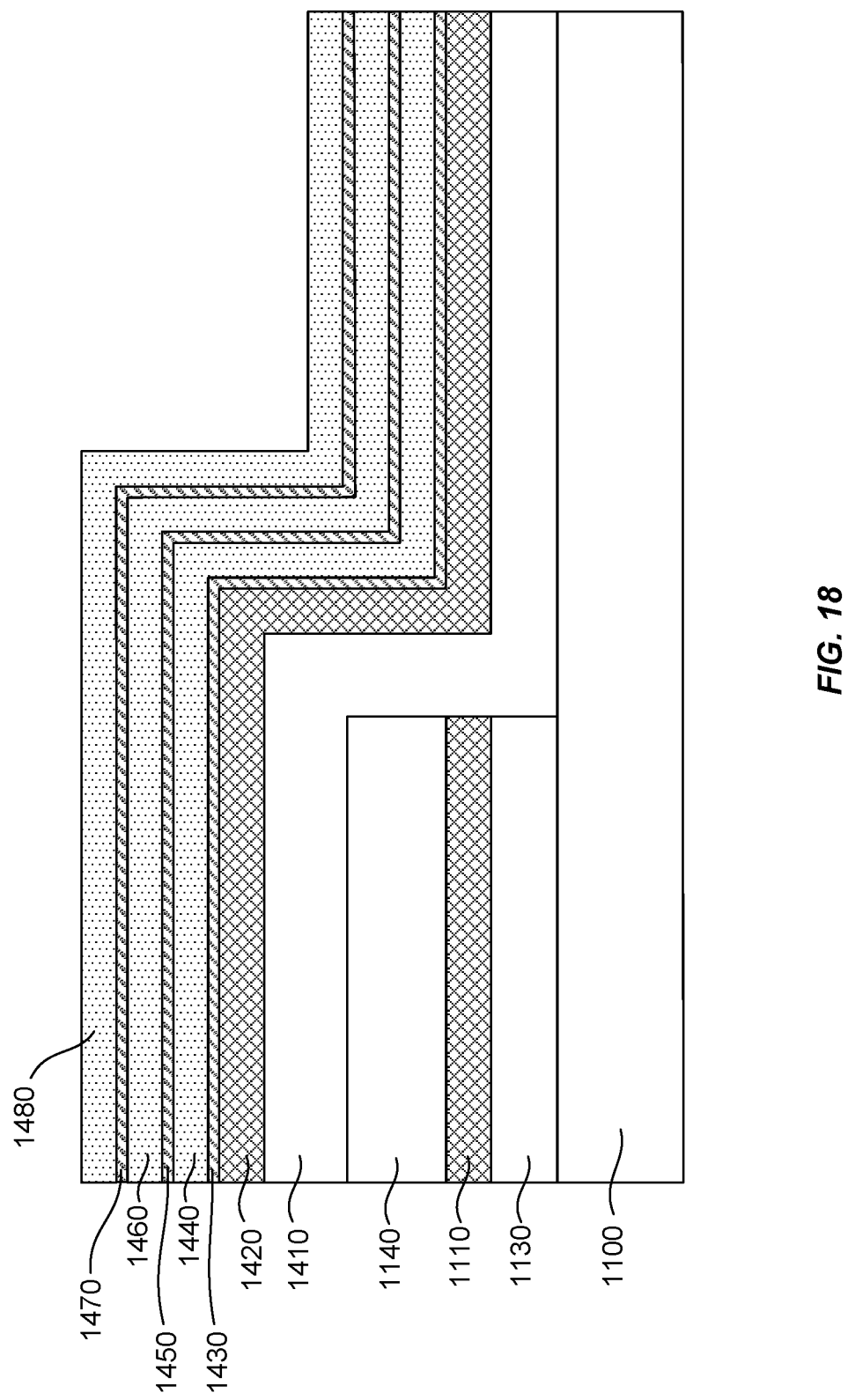
FIG. 18 illustrates layers deposited or grown into a recess where waveguide and cladding layers and are removed, according to an embodiment.
Figure 19:
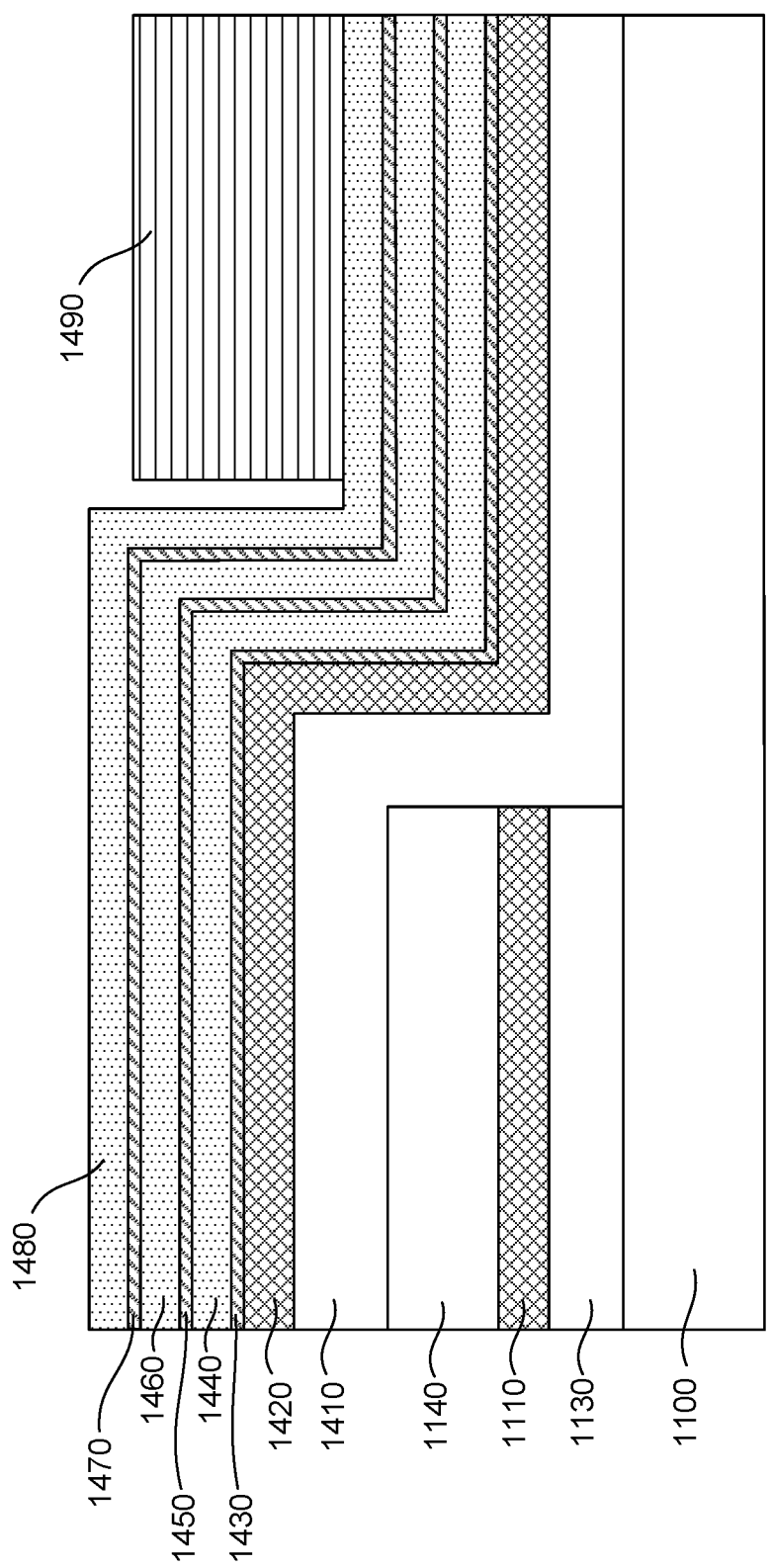
FIG. 19 schematically illustrates a photoresist mask formed over a final mode expander area in the structure of FIG. 18.
Figure 20:
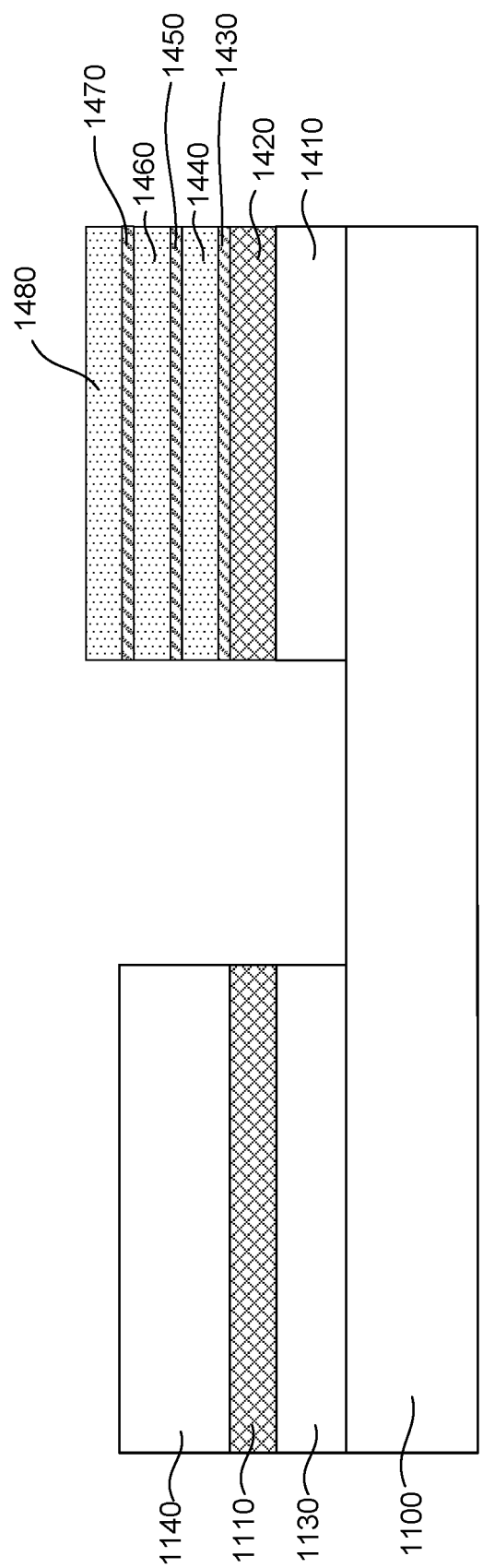
FIG. 20 schematically illustrates the structure of FIG. 18 with layers etched away where they are not protected by the photoresist mask, and with the photoresist mask subsequently removed.

FIGS. 18, 19 and 20 illustrate further strategies for integrating a mode expander with an SiP/SOI structure. In these drawings, SOI substrate 1100 with a waveguide layer 1110 fabricated therein, and cladding layers 1130 and 1140 are the same as those shown in earlier drawings such as FIG. 13. FIG. 18 illustrates layers 1410, 1420, 1430, 1440, 1450, 1460, 1470 and 1480 deposited or grown into a recess where waveguide layer 1110 and cladding layers 1130 and 1140 are removed. Layers 1410-1480 are of materials and thicknesses similar to those described above, that can be used to fabricate a mode expander. For example, layer 1410 is a cladding layer, layers 1420, 1440, 1460 and 1480 are of a high bandgap material, and layers 1430, 1450 and 1470 are etch stop layers that are thin enough to be optically insignificant but thick enough to facilitate dimensional control of a mode expander. FIG. 19 schematically illustrates a photoresist mask 1490 formed over a final mode expander area of the structure shown in FIG. 18. FIG. 20 schematically illustrates layers 1410, 1420, 1430, 1440, 1450, 1460, 1470 and 1480 etched away where they are not protected by photoresist mask 1490, and with photoresist mask 1490 subsequently removed. The structure shown in FIG. 20 is qualitatively similar to that shown in FIGS. 13 and 16 in that layers 1410, 1420, 1430, 1440, 1450, 1460, 1470 and 1480 are located at appropriate heights with respect to layers 1110, 1130 and 1140 so that a mode expander formed therefrom will be vertically aligned to waveguide layer 1110. It will be appreciated upon reading and comprehending the present disclosure that the substeps of step 816 (FIG. 8B) can then be used to complete fabrication of a mode expander.

One of ordinary skill in the art would recognize many variations, modifications, and alternatives to forming a mode expander based on FIGS. 18-20, and on the discussions above. In a first example, instead of using photoresist mask 1490 to mask the entire structure shown in FIG. 18, so that it can be etched back to show the structure shown in FIG. 20, the method disclosed in FIG. 8B can be executed starting on the structure shown in FIG. 18. That is, in the method of FIG. 8B, a first photoresist mask can protect layer 1480 while it is etched to its final shape and position, a second mask can protect layer 1460 while it is etched to its final shape and position, and so forth. Doing so would eliminate the need for the masking step and etch associated with photoresist mask 1490. In another example, instead of depositing or growing all of layers 1410, 1420, 1430, 1440, 1450, 1460, 1470 and 1480 before forming photoresist mask 1490, and etching the layers away at once except where intended to form the mode expander, the layers may be formed and etched individually or in subsets. That is, one or more of layers 1410, 1420, 1430, 1440, 1450, 1460, 1470 and 1480 may be deposited or grown, a photoresist mask formed thereon, and the one or more layers etched before additional layers are deposited or grown. Doing so may simplify the topography to be managed during following ones of the photolithography and/or etching steps. In another example, an additional etch stop layer might be formed over substrate 1100 and layer 1140 before any of layers 1410, 1420, 1430, 1440, 1450, 1460, 1470 and 1480 are deposited or grown, as an aid to protecting substrate 1100, layer 1140, and the edges of layers 1110, 1130 and 1140 during the following etch steps. In yet another example, CMP may be utilized on the structure shown in FIG. 18 to remove the high bandgap and etch stop layers from atop layers 1110, 1130 and 1140 to simplify the remaining topography.

What is claimed is:

1. A method of fabricating a waveguide mode expander, the method comprising:
   providing a silicon on insulator (SOI) substrate comprising a waveguide, wherein:
     the waveguide defines a waveguide thickness and terminates at an output end, and
     the waveguide supports an optical mode of an initial mode size at the output end;
   forming a mounting region adjacent the output end of the waveguide;
   providing a multi-layer chiplet comprising an optical material and one or more additional materials that are different from the optical material, wherein
     a first layer of the optical material defines a first layer thickness that supports an input optical mode size substantially the same size as the initial mode size,
     one or more overlying layers of the optical material define thicknesses that, when combined with the first layer, support an output optical mode size that is larger than the initial mode size, and
     layers of the one or more additional materials are interspersed between the first layer and each of the one or more overlying layers of the optical material;
   bonding the chiplet in the mounting region; and
   selectively removing portions of the chiplet to form tapered stages that successively increase in number and lateral size from a proximal end of the chiplet adjacent the waveguide, to a distal end of the chiplet, each tapered stage being formed of a portion of a respective layer of the multi-layer chiplet,
   such that the first layer and the tapered stages form a waveguide mode expander that adiabatically expands an optical mode of light traversing the chiplet, from the initial optical mode size entering the proximal end, to the output optical mode size at the distal end.

2. The method of claim 1 wherein the waveguide comprises at least one of crystalline silicon, polycrystalline silicon and amorphous silicon.

3. A method of fabricating a waveguide mode expander, the method comprising:
   providing a silicon on insulator (SOI) substrate comprising a waveguide, wherein:
     the waveguide defines a waveguide thickness and terminates at an output end, and
     the waveguide supports an optical mode of an initial mode size at the output end;
   forming a mounting region adjacent the output end of the waveguide;
   providing a multi-layer chiplet comprising one or more optical materials, wherein:
     a lower layer of the chiplet comprises a metal layer,
     a first layer of the one or more optical materials defines a first layer thickness that supports an input optical mode size substantially the same size as the initial mode size, and
     one or more overlying layers define thicknesses that, when combined with the first layer, support an output optical mode size that is larger than the initial mode size;
   bonding the chiplet in the mounting region, wherein bonding the chiplet comprises forming a metal to semiconductor bond with the SOI substrate; and
   selectively removing portions of the chiplet to form tapered stages that successively increase in number and lateral size from a proximal end of the chiplet adjacent the waveguide, to a distal end of the chiplet, each tapered stage being formed of a portion of a respective layer of the multi-layer chiplet,
   such that the first layer and the tapered stages form a waveguide mode expander that adiabatically expands an optical mode of light traversing the chiplet, from the initial optical mode size entering the proximal end, to the output optical mode size at the distal end.

4. The method of claim 1 wherein the first layer thickness is equal to the waveguide thickness.

5. A method of fabricating a waveguide mode expander, the method comprising:
   providing a silicon on insulator (SOI) substrate comprising a waveguide, wherein:
     the waveguide defines a waveguide thickness and terminates at an output end, and
     the waveguide supports an optical mode of an initial mode size at the output end;
   forming a mounting region adjacent the output end of the waveguide;
   providing a multi-layer chiplet comprising one or more optical materials, wherein
     a first layer of the one or more optical materials defines a first layer thickness that supports an input optical mode size substantially the same size as the initial mode size, and
     one or more overlying layers define thicknesses that, when combined with the first layer, support an output optical mode size that is larger than the initial mode size, and wherein providing the multi-layer chiplet comprises:
     successively depositing the first layer and the one or more overlying layers on a substrate; and
     singulating the substrate to form multiple ones of the chiplet;
   bonding the chiplet in the mounting region; and
   selectively removing portions of the chiplet to form tapered stages that successively increase in number and lateral size from a proximal end of the chiplet adjacent the waveguide, to a distal end of the chiplet, each tapered stage being formed of a portion of a respective layer of the multi-layer chiplet,
   such that the first layer and the tapered stages form a waveguide mode expander that adiabatically expands an optical mode of light traversing the chiplet, from the initial optical mode size entering the proximal end, to the output optical mode size at the distal end.

6. The method of claim 5 wherein the substrate comprises a compound semiconductor.

7. The method of claim 6 wherein the compound semiconductor is characterized by a substrate lattice constant, and wherein the first layer and the one or more overlying layers are characterized by lattice constants that match the substrate lattice constant.

8. The method of claim 5 wherein providing the multi-layer chiplet comprises:
  forming the first layer and alternating ones of the one or more overlying layers of a first one of the one or more optical materials; and
  forming etch stop layers, that are interspersed between the first layer and the alternating ones of the one or more overlying layers, of a different material than the first one of the one or more optical materials.

9. The method of claim 8 wherein selectively removing portions of the chiplet comprises:
  applying a photoresist mask to protect a tapered portion of the chiplet; and
  etching a layer of the chiplet that is not protected by photoresist until an underlying etch stop layer is exposed.

10. The method of claim 9 wherein applying a photoresist mask and etching a layer of the chiplet are repeated for each of the one or more overlying layers and for the first layer.

11. The method of claim 9, further comprising removing the underlying etch stop layer.

12. The method of claim 11, wherein an etch that etches the layer of the chiplet that is not protected by photoresist is selective to the underlying etch stop layer, and an etch that removes the underlying etch stop layer is selective to a layer of the chiplet that underlies the underlying etch stop layer.

13. The method of claim 1,
  wherein bonding the chiplet in the mounting region includes positioning the chiplet such that a gap exists between the output end of the waveguide and the chiplet;
  and further comprising forming an optical bridge between the waveguide mode expander and the waveguide, such that the optical bridge spans the gap.

14. A method of coupling a first waveguide with a second waveguide, the method comprising:
  providing a silicon on insulator (SOI) substrate comprising the first waveguide and the second waveguide, wherein:
    the first waveguide defines a first waveguide thickness and terminates at an output end,
    the first waveguide supports a first optical mode of an initial mode size at the output end,
    the second waveguide defines a second waveguide thickness and terminates at an input end,
    the second waveguide supports a second optical mode of a final mode size at the input end, the final mode size being greater than or equal to the initial mode size;
  forming a mounting region between the output end of the first waveguide and the input end of the second waveguide;
  providing a multi-layer chiplet comprising one or more optical materials, wherein
    a first layer of the one or more optical materials defines a first layer thickness that supports an input optical mode size substantially the same size as the initial mode size, and
    one or more overlying layers define thicknesses that, when combined with the first layer, support an output optical mode size that is substantially the same size as the final mode size;
  bonding the chiplet in the mounting region; and
  selectively removing portions of the chiplet to form tapered stages that successively increase in number and lateral size from a proximal end of the chiplet adjacent the first waveguide, to a distal end of the chiplet adjacent the second waveguide, each tapered stage being formed of a portion of a respective layer of the multi-layer chiplet,
  such that the first layer and the tapered stages form a waveguide mode expander that adiabatically expands an optical mode of light traversing the chiplet, from the initial mode size entering the proximal end, to the output optical mode size at the distal end.

15. The method of claim 14, wherein at least one of the first and second waveguides comprises at least one of crystalline silicon, polycrystalline silicon and amorphous silicon.

16. The method of claim 14,
  wherein bonding the chiplet in the mounting region includes positioning the chiplet such that a first gap exists between the output end of the first waveguide and the chiplet, and a second gap exists between the chiplet and the input end of the second waveguide;
  and further comprising forming:
    a first optical bridge between the first waveguide and the waveguide mode expander, such that the first optical bridge spans the first gap; and
    a second optical bridge between the waveguide mode expander and the second waveguide, such that the second optical bridge spans the second gap.

17. The method of claim 14, wherein the SOI substrate comprises a crystalline silicon substrate, a bottom oxide layer, a first silicon layer in which the first waveguide is formed and a second silicon layer in which the second waveguide is formed;
  the first silicon layer guides the first optical mode at a first height relative to the silicon substrate;
  the second silicon layer guides the second optical mode at a second height relative to the silicon substrate, the second height being greater than the first height; and
  the waveguide mode expander moves the optical mode of light traversing the chiplet from the first height at the proximal end to the second height at the distal end.

18. The method of claim 3 wherein the waveguide comprises at least one of crystalline silicon, polycrystalline silicon and amorphous silicon.

19. The method of claim 3 wherein the first layer thickness is equal to the waveguide thickness.

20. The method of claim 3,
  wherein bonding the chiplet in the mounting region includes positioning the chiplet such that a gap exists between the output end of the waveguide and the chiplet;
  and further comprising forming an optical bridge between the waveguide mode expander and the waveguide, such that the optical bridge spans the gap.

* * * * *